US012517095B2

(12) United States Patent
Leger

(10) Patent No.: US 12,517,095 B2
(45) Date of Patent: Jan. 6, 2026

(54) PERFORMING CONSUMABLE DIAGNOSTICS VIA SPECTRAL ANALYSIS

(71) Applicant: The ESAB Group Inc., North Bethesda, MD (US)

(72) Inventor: Erik Anthony Leger, Peterborough, NH (US)

(73) Assignee: THE ESAB GROUP INC., North Bethesda, MD (US)

( * ) Notice: Subject to any disclaimer, the term of this patent is extended or adjusted under 35 U.S.C. 154(b) by 448 days.

(21) Appl. No.: 17/882,150

(22) Filed: Aug. 5, 2022

(65) Prior Publication Data

US 2023/0041893 A1 Feb. 9, 2023

Related U.S. Application Data

(60) Provisional application No. 63/230,888, filed on Aug. 9, 2021.

(51) Int. Cl.
*G01N 29/46* (2006.01)
*G01N 29/11* (2006.01)
(Continued)

(52) U.S. Cl.
CPC .......... *G01N 29/46* (2013.01); *G01N 29/11* (2013.01); *G01N 29/12* (2013.01); *G01N 29/14* (2013.01);
(Continued)

(58) Field of Classification Search
CPC ......... G01N 29/46; G01N 29/14; G01N 29/12
See application file for complete search history.

(56) References Cited

U.S. PATENT DOCUMENTS 3,694,637 A   9/1972 Edwin et al.
4,811,605 A * 3/1989 Nadeau .................. G01N 29/14
                                                    73/645

(Continued)

FOREIGN PATENT DOCUMENTS

CN   110953488 B   4/2021
DE     3333151 A1  3/1985
(Continued)

OTHER PUBLICATIONS

Notification of Transmittal of International Search Report and Written Opinion including International Search Report and Written Opinion for International Application No. PCT/US2022/039695 dated Nov. 2, 2022, 16 pages.

(Continued)

*Primary Examiner* — Erika J. Villaluna
(74) *Attorney, Agent, or Firm* — Edell, Shapiro & Finnan, LLC

(57) ABSTRACT

A method of determining wear/degradation levels of a consumable assembly of a welding/plasma torch may utilize a controlled sound signal in order to determine an acoustic profile or full spectral audio analysis dataset of the consumable assembly that facilitate the identification of patterns that correlate to certain wear/degradation levels of the consumable assembly. The full spectral audio analysis dataset may be obtained by subjecting a given consumable assembly to a controlled sound signal between operations and as the consumable assembly degrades over time. The full spectral audio analysis may serve as a wear/degradation profile over the life of the given consumable assembly. With a full dataset known for a particular consumable assembly model, an acoustic profile of another consumable assembly of the same model may be obtained and compared to the full (Continued)

dataset in order to identify the wear/degradation level of the tested consumable assembly.

20 Claims, 12 Drawing Sheets

(51) Int. Cl.
*G01N 29/12* (2006.01)
*G01N 29/14* (2006.01)
*G01N 29/34* (2006.01)
*G01N 29/44* (2006.01)
*H05H 1/26* (2006.01)

(52) U.S. Cl.
CPC ....... *G01N 29/348* (2013.01); *G01N 29/4454* (2013.01); *G01N 29/4481* (2013.01); *H05H 1/26* (2013.01); *G01N 2291/0258* (2013.01); *G01N 2291/101* (2013.01); *G01N 2291/2698* (2013.01)

(56) References Cited

U.S. PATENT DOCUMENTS

| | | |
|---|---|---|
| 6,297,467 B1 | 10/2001 | Maev et al. |
| 6,857,553 B1 | 2/2005 | Hartman et al. |
| 7,004,370 B2 | 2/2006 | Arndt et al. |
| 7,072,798 B2 | 7/2006 | Yuasa |
| 7,186,944 B2 | 3/2007 | Matus et al. |
| 8,809,738 B2 | 8/2014 | Ryan et al. |
| 9,091,588 B2 | 7/2015 | Lefler |
| 10,144,080 B2 | 12/2018 | Chantry et al. |
| 10,241,091 B2 | 3/2019 | Cybulsky et al. |
| 10,274,364 B2 * | 4/2019 | Blair .................. G01N 29/4454 |
| 10,695,783 B2 | 6/2020 | Blair et al. |
| 10,724,999 B2 | 7/2020 | Cybulsky et al. |
| 2011/0016974 A1 | 1/2011 | Wagner |
| 2014/0130576 A1 | 5/2014 | Blendinger et al. |

FOREIGN PATENT DOCUMENTS

| | | |
|---|---|---|
| DE | 102011118419 A1 | 5/2013 |
| FR | 2911685 A1 | 7/2008 |
| JP | 59150337 A | 8/1984 |
| WO | 9303882 | 3/1993 |
| WO | 200977018 A1 | 6/2009 |
| WO | 201126638 A1 | 3/2011 |
| WO | 201196681 A2 | 8/2011 |
| WO | 202064974 A1 | 4/2020 |

OTHER PUBLICATIONS

Rat V., et al., Acoustic signature analysis of the interaction between a dc plasma jet and a suspension liquid jet, Journal of Physics D: Applied Physics, Institute of Physics Publishing, Bristol, GB, vol. 42, No. 19, Oct. 7, 2009, 12 pages.

* cited by examiner

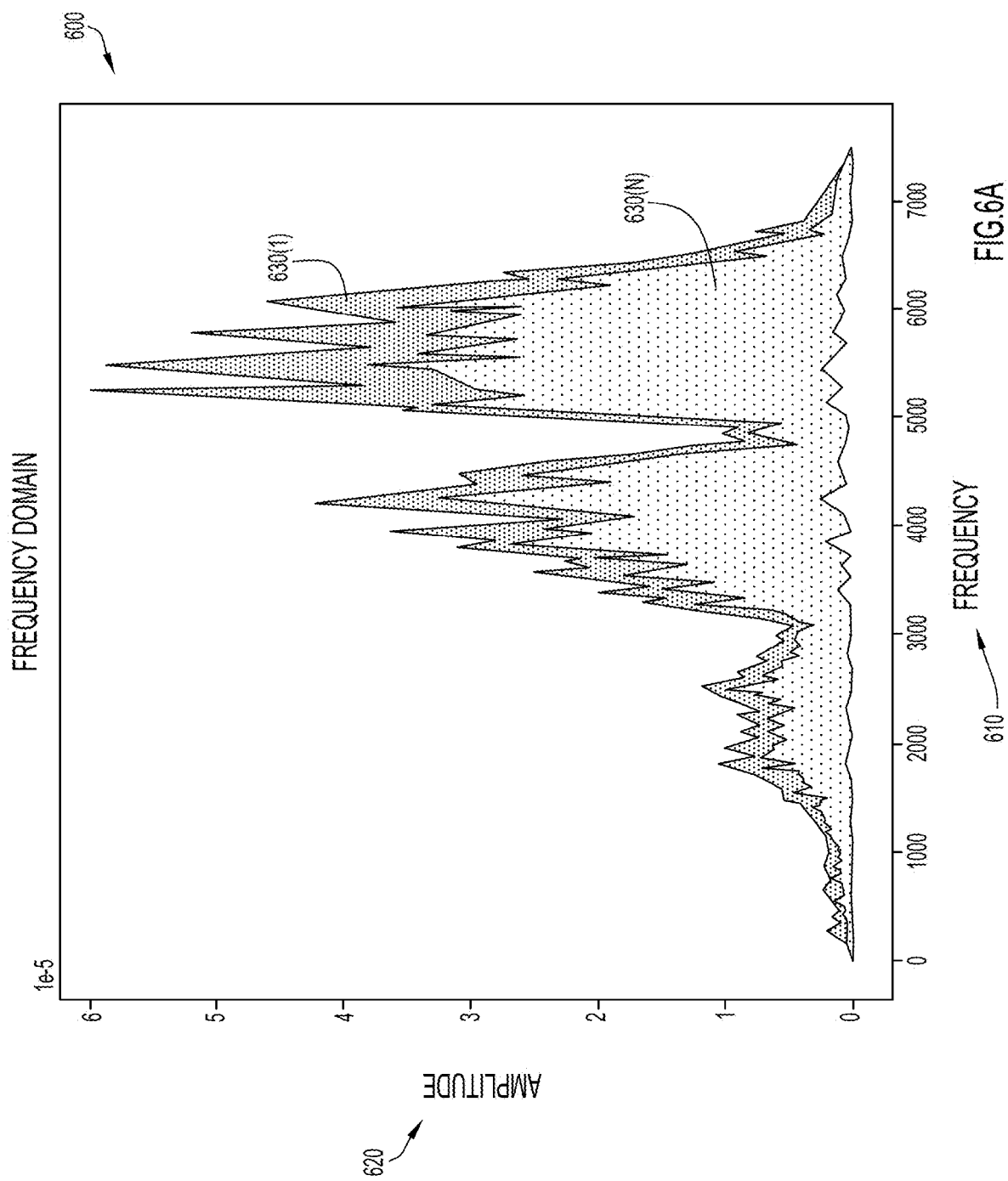

PERFORMING CONSUMABLE DIAGNOSTICS VIA SPECTRAL ANALYSIS

CROSS-REFERENCE TO RELATED APPLICATION

This application claims priority to U.S. Provisional Application No. 63/230,888, filed Aug. 9, 2021, the entirety of which is incorporated herein by reference

TECHNICAL FIELD

The present disclosure is directed toward welding and/or cutting torches and, in particular, to methods of performing diagnostics of consumable assemblies of welding and/or cutting torches by completing a spectral analysis of the components of the consumable assemblies.

BACKGROUND OF THE INVENTION

The ability to adequately and accurately perform diagnostics of components of a consumable assembly of a torch (such as, but not limited to, determining the wear levels or degradation of the components, faults, errors, misalignment of parts, improper cut parameters for a consumable assembly, machine defects, etc.) is limited. Because of this, and given the cost of the stock materials used for work-pieces, operators of torches are more inclined to replace consumable assemblies prematurely than risk a failure by the consumable assembly that could potentially ruin the work-piece.

In the past, static acoustical spectral analysis techniques have been attempted to perform diagnostics of consumable assemblies, but these previously attempted techniques have not proved productive. These past techniques were often focused on sampling and analyzing the sound produced during a cut and gathering information associated with the quality of the cut, as well as detect any defects. The problem with these past techniques, however, is that the sound or acoustical profiles are under-defined due to a multitude of variables (e.g., plasma gas pressure, shield gas pressure, stepper motor pulsation, proper O-ring seating, type and quality of consumable assemblies, background shop noise, etc.). In other words, because of the number of variables, it is not possible to correlate each acoustical profile with a unique spectral signature, e.g., wave frequencies and amplitudes. A sound signal whose components are not consistent/benchmarked prior to performing the diagnostics cannot yield predictions of any sufficient error margin.

Understanding the lifespan and degree of degradation in torch consumable assemblies, as well as identifying faults, errors, misalignment of parts, machine defects, etc., without disassembling the consumable assemblies addresses the challenges of field efficiency and unnecessary discarding of otherwise healthy consumable assemblies. Thus, what is needed is a method or process for dynamically performing diagnostics of torch consumable assemblies. It would be desirable for this method or process to utilize sound/acoustics due to sound being commonly available and being inexpensively sensed with relatively small sized equipment. It would further be desirable for this method or process to utilize sound/acoustics because sonic data is relatively simple to process and is also an incredibly dense form of data. It may also be desirable to utilize machine learning techniques to identify patterns and trends in the sound data that correlate to certain diagnostic indicators for the torch consumable assemblies. It would be further desirable to address the economic efficiency of replacing consumable assemblies by providing both the machine and the user feedback related to the degree of degradation of a current consumable assembly being used, as well as having the potential capability to detect misalignment, manufacturing inconsistencies, cut gas leaks/flowrate problems, improper installation in torch consumables, etc.

SUMMARY OF THE INVENTION

The present disclosure is directed towards a method and apparatus for acquiring acoustic profiles of consumable assemblies of welding/cutting torches, where a compilation of the acquired acoustic profiles (i.e., a full spectral audio analysis dataset) may be capable of representing certain diagnostic indicators (such as, but not limited to, the wear conditions or degree of degradation of the consumable assembly over the life of the consumable assembly, misalignment of torch components, manufacturing inconsistencies of torch components, cut gas leaks/flowrate problems, improper installation of torch consumables, etc.). The method may utilize a controlled sweep of an acoustic/sound signal/excitation in order to eventually identify patterns/deviations by subsequent acoustic profiles with respect to a baseline profile that represents a new and unworn consumable assembly. The controlled sound signals may be a controlled frequency sweep output by an acoustical output generating device (e.g., a speaker) or the ramping of the flow of gas through the consumable assembly during pre-flow conditions. The ramping of the flow of gas through the consumable assembly may be capable of producing a very repeatable acoustic spectrum (e.g., audible and/or inaudible soundwaves/frequencies), which may encode information about the structures/components that the gas interacts with along its path through the consumable assembly. (i.e., geometry and surface roughness of the structures/components affect acoustic response spectrum, resonant frequency, average amplitude etc.)

The present disclosure is also directed towards a method and apparatus for determining, at any given point in the life of a consumable assembly, certain diagnostic indicators of the consumable assembly (e.g., the current wear condition or degree of degradation of the consumable assembly) by comparing a tested acoustical profile of a consumable assembly to a previously acquired full spectral audio analysis dataset of the consumable assembly. Thus, the method may be utilized to quickly test and determine any diagnostic indicators of a consumable assembly at any point over the life of the consumable assembly. This enables a user to quickly and accurately determine any potential issues (e.g., overly worn/degraded consumable assembly, misaligned components of a consumable assembly, faulty components of a consumable assembly, etc.) with a consumable assembly with minimum inspection and testing. This method will further eliminate the premature replacement of consumable assemblies.

The present invention is further directed to an apparatus configured to perform the methods described above. In some embodiments, the apparatus may include an enclosure that is configured to receive at least the consumable assembly, where an acoustical output generating device and a acoustical capturing device are disposed within the enclosure and configured to determine an acoustic profile of a consumable assembly disposed within the enclosure. The acoustical output generating device and/or the acoustical capturing device may be operatively connected with an acoustic analysis computing device that is capable of performing many of the steps required to acquire a full spectral acoustic analysis dataset, and/or determine any diagnostic indicators of a consumable assembly. In other embodiments, the apparatus may not include an enclosure or an acoustical output generating device, and may simply include an acoustical capturing device capable of being disposed in proximity of the consumable assembly, and an acoustic analysis computing device operatively coupled to the acoustical capturing device.

Other systems, methods, features and advantages will be, or will become, apparent to one with skill in the art upon examination of the following figures and detailed description. All such additional systems, methods, features and advantages are included within this description, are within the scope of the claimed subject matter.

BRIEF DESCRIPTION OF THE DRAWINGS

The torches, consumable assemblies, apparatuses, and steps presented herein may be better understood with reference to the following drawings and description. It should be understood that some elements in the figures may not necessarily be to scale and that emphasis has been placed upon illustrating the principles disclosed herein. In the figures, like-referenced numerals designate corresponding parts/steps throughout the different views.

FIG. 6A illustrates a frequency domain chart or Bode plot generated by the acoustic analysis computing device illustrated in FIG. 4, the frequency domain chart plotting an example of the amplitudes of various frequencies captured by the acoustic analysis computing device when performing a spectral audio analysis of a consumable assembly in accordance with the present invention.

DETAILED DESCRIPTION OF THE INVENTION

Figure 1A:
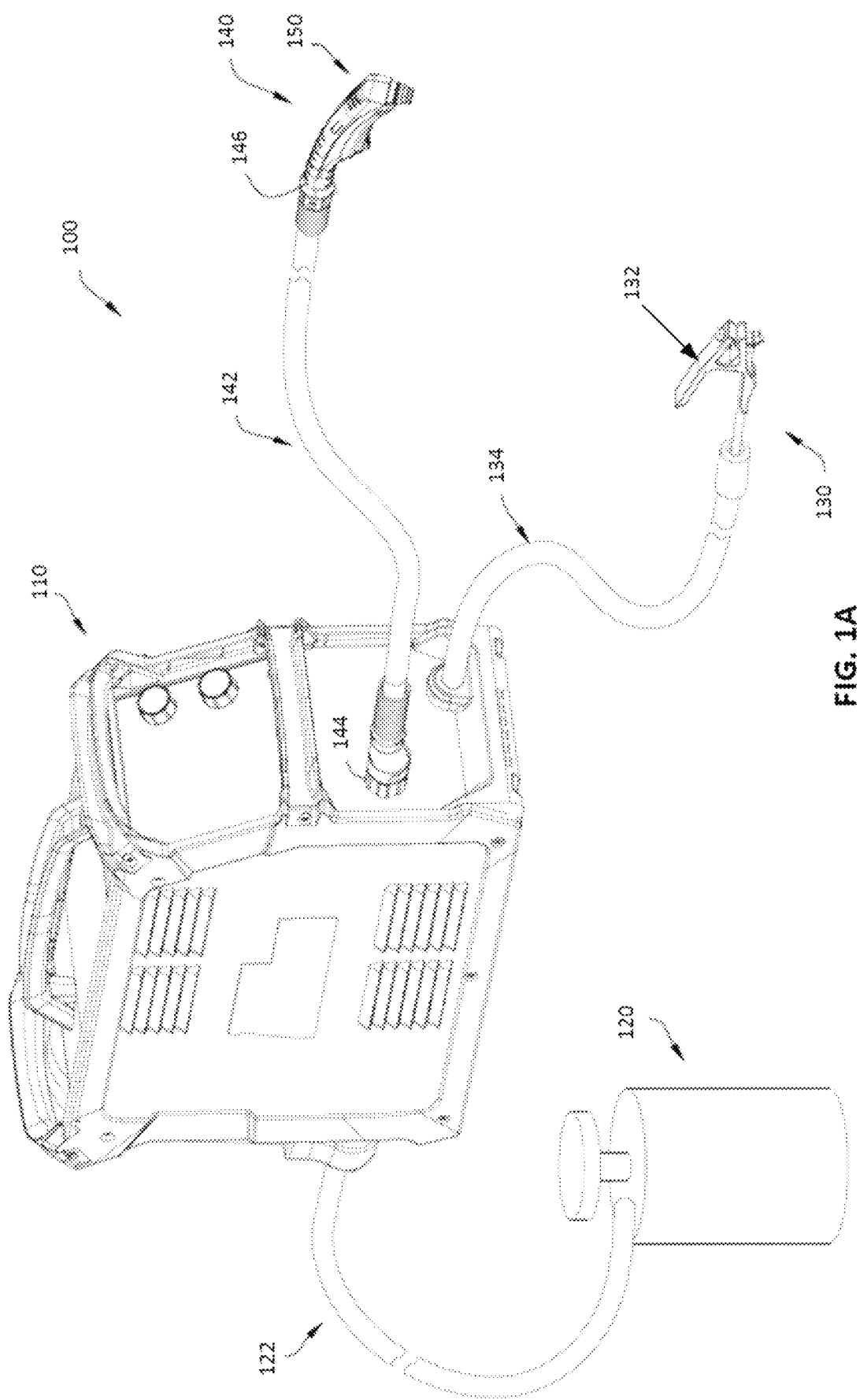
FIG. 1A illustrates a perspective view of a cutting system including a power source and torch assembly, according to an example embodiment of the present disclosure.

The present invention is directed to a method and apparatus for determining diagnostic indicators of a consumable assembly of a welding/plasma torch. The method may utilize a controlled acoustic/sound signal in order to determine a frequency response profile or full spectral audio analysis dataset of the consumable assembly and identify patterns that correlate to certain diagnostic indicators (e.g., wear/degradation levels of the consumable assembly faulty components, misalignment of components/parts, machine defects of components, improper cut parameters for a consumable assembly etc.). The full spectral audio analysis dataset may be obtained by subjecting a given consumable assembly to a controlled acoustic signal sweep between operations performed by the given consumable assembly (i.e., as the consumable assembly degrades over time). The full spectral audio analysis dataset may serve as a profile over the life of the given consumable assembly. With a full dataset benchmarked over the life of a particular consumable assembly model, an acoustic profile of another consumable assembly of the same model may be obtained and compared to the full dataset in order to identify patterns that represent the current wear/degradation level of the tested consumable assembly. In some embodiments, the controlled sound signal may be a controlled frequency sweep output by an acoustical output generating device (e.g., a speaker). In other embodiments, the controlled sound signal may be the ramping of gas through the consumable assembly. The ramping of the gas through the consumable assembly may be capable of producing a very repeatable acoustic spectrum, which may encode information about everything that the gas interacts with along its path through the consumable assembly.

Sound, acoustic, audio, sonic, and other similar and related terms, as used herein, refer to vibrations or energy that is transmitted by waves in a material medium (such as air) that may be audible or inaudible.

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the description herein. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

While the embodiments disclosed herein may be utilized to perform diagnostics or determine diagnostic indicators of a consumable assembly, the descriptions of FIGS. 1A, 1B, 2-5, 6A, 6B, and 7-10 refer to the example of determining the wear/degradation level of a consumable assembly for illustrative purposes only. Thus, while the descriptions of FIGS. 1A, 1B, 2-5, 6A, 6B, and 7-10 describe systems, apparatuses, and methods for determining the wear/degradation level of a consumable assembly, the same systems, apparatuses, and methods may further be used to perform other diagnostics or determine other diagnostic indicators (e.g., such as, but not limited to, determining misalignment of parts, gas pressure variances, material or surface defects in machined parts of the consumable assembly, coolant flow variances, gantry vibration, etc.).

FIG. 1A illustrates an example embodiment of a manual cutting system 100 that may utilize a plasma arc torch embodiment presented herein. While FIG. 1A illustrates a manual cutting system 100, the present invention shall not be limited to manual cutting systems. The present invention disclosed herein may also be applicable to automated cutting systems (e.g., robotic cutting systems), as well as welding systems. The manual cutting system 100 illustrated in FIG. 1A is intended for illustrative purposes only. At a high-level, the manual cutting system 100 may include a power supply 110 and a torch assembly 140. The power supply 110 may be configured to supply (or at least control the supply of) power and gas to a torch 150 included in the torch assembly 140 via torch lead 142 (also referred to as cable hose 142). For example, the power supply 110 may meter a flow of gas received from a gas supply 120, which the power supply 110 receives via cable hose 122, before or as the power supply 110 supplies gas to the torch 150 via cable hose 142.

The manual cutting system 100 may also include a working lead assembly 130 with a grounding clamp 132 that is connected to the power supply by a work lead 134 (also referred to as cable hose 134). As illustrated, cable hose 122, cable hose 134, and cable hose 142 may each be any length. Moreover, each end of cable hose 122, cable hose 134, and cable hose 142 may be connected to components of the manual cutting system 100 via any connectors now known or developed hereafter (e.g., via releasable connectors). For example, torch 150 may be connected to a distal end of cable hose 142 via a quick disconnect connector 146 and power supply 110 may be connected to a proximal end of cable hose 142 via a quick disconnect connector 144.

Figure 1B:
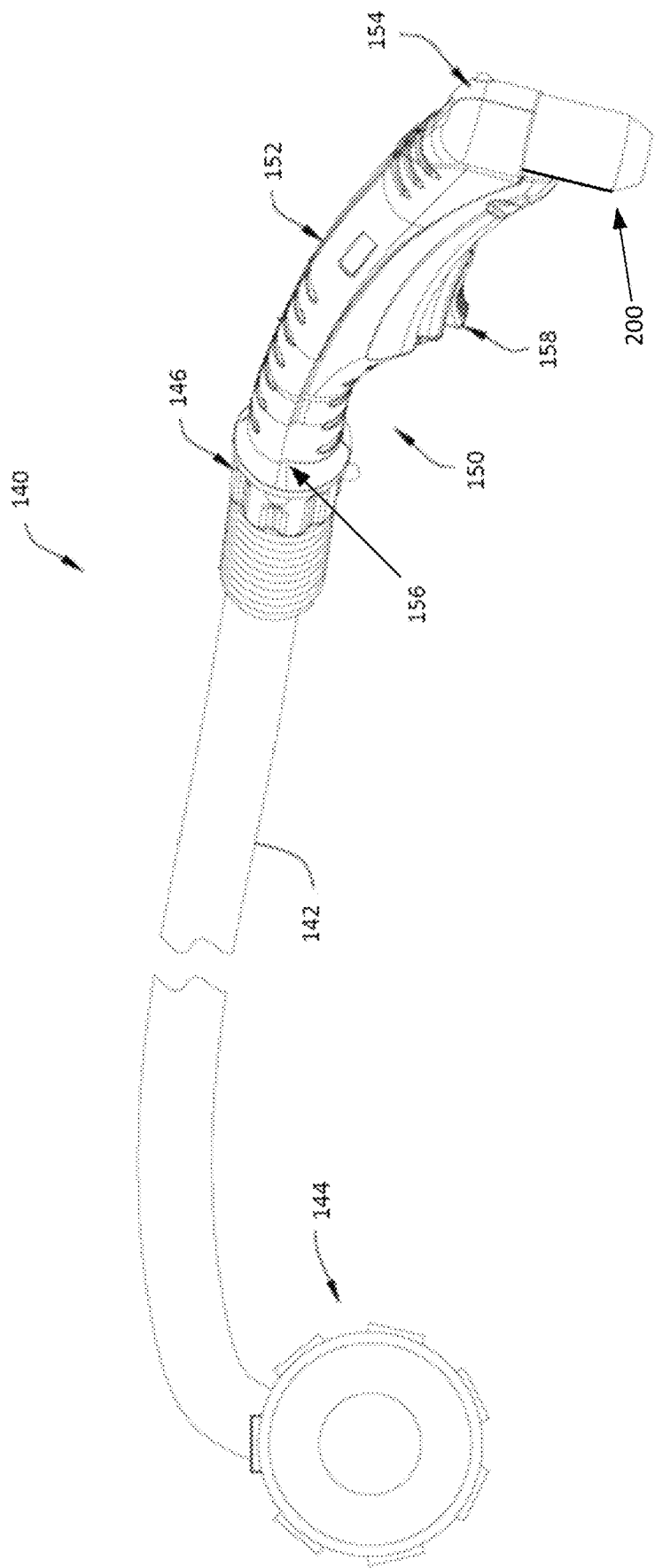
FIG. 1B illustrates a perspective view of the torch assembly of FIG. 1A.

FIG. 1B illustrates the torch assembly 140 of FIG. 1A isolated from the power supply 110. As can be seen, the torch 150 includes a torch body 152 that extends from a first end 156 (e.g., a connection end 156) to a second end 154 (e.g., an operating or operative end 154). The torch body 152 may also include a trigger 158 that allows a user to initiate cutting operations in any manner now known or developed hereafter (e.g., in a 2 T or 4 T mode). As mentioned above, the connection end 156 of the torch body 152 may be coupled (in any manner now known or developed hereafter) to one end of lead 142. Meanwhile, the operative end 154 of the torch body 152 may receive interchangeable components, such as a consumable assembly 200 that facilitate cutting operations.

Figure 2:
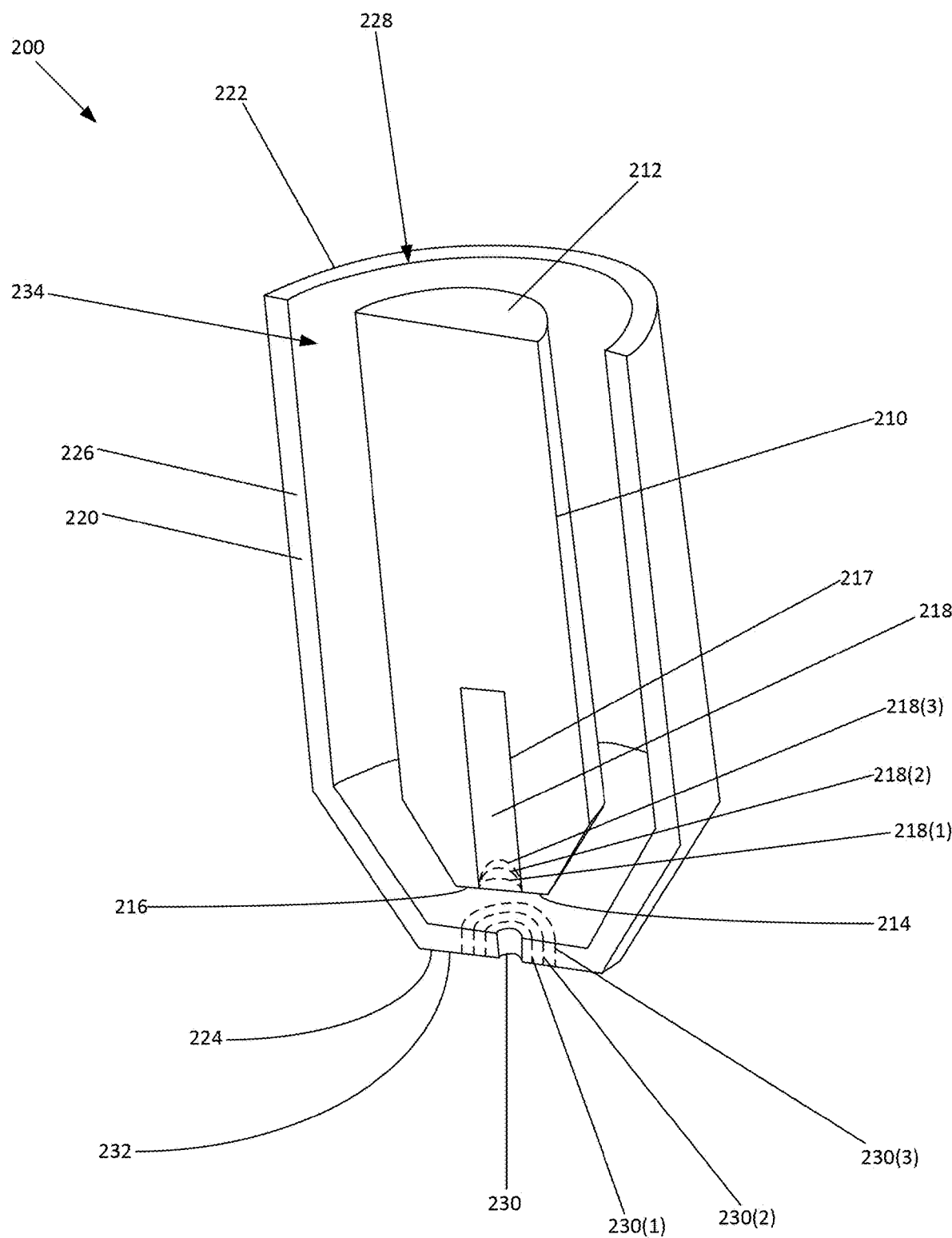
FIG. 2 illustrates a cross-sectional view of an embodiment of a consumable assembly utilized by the torch illustrated in FIGS. 1A and 1B, and in according with the present disclosure.

FIG. 2 illustrates a cross-sectional view of at least a portion of the consumable assembly 200 shown in FIG. 1B. The consumable assembly 200 includes at least an electrode 210 and a nozzle 220. While other components of the consumable assembly 200 are not illustrated, the techniques and methods described herein may be utilized to determine the wear condition or degree of degradation of any type of consumable assembly that includes any number of components including, but not limited to, a swirl ring, a retaining cap, a shield cap, a shield, an arc initiator, gas management components, mechanical components, magnetic components, and/or any other components to help initiate and stabilize an arc for plasma cutting or welding operations.

The electrode 210 shown in FIG. 2 is elongated with a first or proximal end 212 and an opposite second or distal end 214. The distal end 214 of the electrode 210 may contain an end face 216 with a cavity 217, within which an emissive insert 218 may be disposed. Further depicted in FIG. 2 is a series of degradation lines 218(1), 218(2), 218(3) of the emissive insert 218, which are shown in phantom. Each of the degradation lines 218(1), 218(2), 218(3) represent a level of degradation of the emissive insert 218 as the emissive insert 218 is worn away from the end face 216 of the electrode 210 due to successive cut operations performed by the electrode 210. In other words, as the emissive insert 218 degrades, the emissive insert 218 recedes within the cavity 217 of the electrode 210. Thus, the emissive insert 218 may degrade first to degradation line 218(1) after a first number of cut operations, while later degrading to degradation line 218(2) after a second number of cut operations and degradation line 218(3) after a third number of cut operations, where the third number of cut operations is greater than the second number and the first number, and where the second number of cut operations is greater than the first number of cut operations.

The nozzle 220 illustrated in FIG. 2 may include a first or proximal end 222 and an opposite second or distal end 224. The nozzle 220 may further include a sidewall 226 that extends from the proximal end 222 to the distal end 224. As illustrated, a first opening 228 may be disposed within the proximal end 222 of the nozzle 220, while a second opening or orifice 230 may be disposed within an end face 232 of the distal end 224 of the nozzle 220. The proximal end 222, distal end 224, and sidewall 226 may collectively define an interior volume or interior cavity 234. As illustrated in FIG. 2, the electrode 210 may be at least partially disposed within the interior cavity 234 such that the emissive insert 218 is disposed proximate to, and axially aligned with, the orifice 230 of the nozzle 220.

As further illustrated in FIG. 2, the orifice 230 of the nozzle 220 may be configured to degrade over a series of cut operations performed by the consumable assembly 200, which is depicted via a series of degradation lines 230(1), 230(2), 230(3) that are shown in phantom (also referred to herein as orifice wear). Each of the degradation lines 230(1), 230(2), 230(3) represent a degree of degradation of the orifice 230 as it increases in size/radius, or otherwise change in shape, due to successive cut operations performed by the consumable assembly 200. In other words, as the nozzle 220 degrades over time from successive cut operations, the material of the end face 232 that surrounds the orifice 230 is worn away, which results in an increase in the size/radius, or otherwise change in shape, of the orifice 230. Thus, the orifice 230 of the nozzle 220 may degrade first to degradation line 230(1) after a first number of cut operations, while later degrading to degradation line 230(2) after a second number of cut operations and degradation line 230(3) after a third number of cut operations, where the third number of cut operations is greater than the second number and the first number, and where the second number of cut operations is greater than the first number of cut operations.

Thus, as the number of cuts performed by the consumable assembly 200 increases, the emissive insert 218 becomes worn away (i.e., to degradation lines 218(1), 218(2), 218(3)) from the end face 216 of the electrode 210 (i.e., the emissive insert 218 recedes within cavity 217), while the orifice 230 of the nozzle 220 also becomes worn away (i.e., to degradation lines 230(1), 230(2), 230(3)) such that the orifice 230 increases in size. Accordingly, an internal open volume of the consumable assembly 200 may change in size and or shape, and thus, a resonance frequency of the consumable assembly 200 may change as it becomes worn. Once worn, the consumable assembly 200 may be replaced with a new consumable assembly of a same type as the worn consumable assembly.

Figure 3:
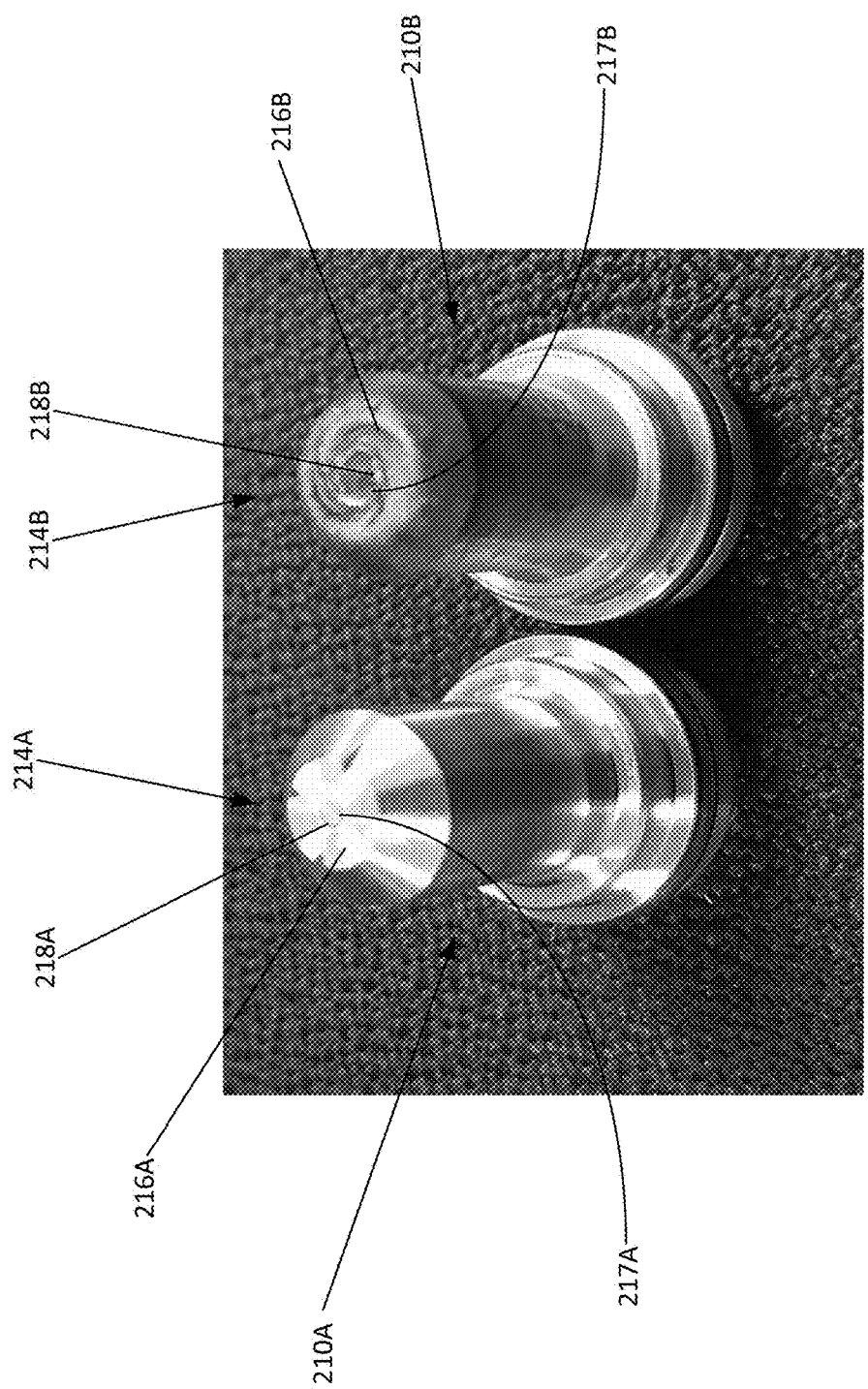
FIG. 3 illustrates perspective views of a new condition/unworn electrode and a worn electrode, the illustrated electrodes being versions of the electrode of the embodiment of the consumable assembly illustrated in FIG. 2, each version representing a different point in time of the lifespan of the electrode.

Turning to FIG. 3, and with continued reference to FIG. 2, illustrated are two electrodes 210A and 210B that may be the same or similar model as that illustrated in FIG. 2. The electrode 210A illustrated in FIG. 3 may be a "new" and unused electrode that has not yet performed any cut operations. Thus, the emissive insert 218A of the electrode 210A is not worn away from the cavity 217A. Conversely, the electrode 210B illustrated in FIG. 3 may represent an electrode that has performed a number of cut operations such that the emissive insert 218B has degraded when compared to that of the emissive insert 218A of the unused electrode 210A. Thus, the emissive insert 218B of the electrode 210B has been worn away and receded into the cavity 217B of the end face 216B of the electrode 210B. Moreover, as further illustrated in FIG. 3, the end face 216B of the worn electrode 210B may also be worn and deformed when compared to that of the end face 216A of the unused electrode 210A (e.g., the edges and angled surfaces present around the distal end 214A of the unused electrode 210A are not present or visible in the distal end 214B of the worn electrode 210B).

Figure 4:
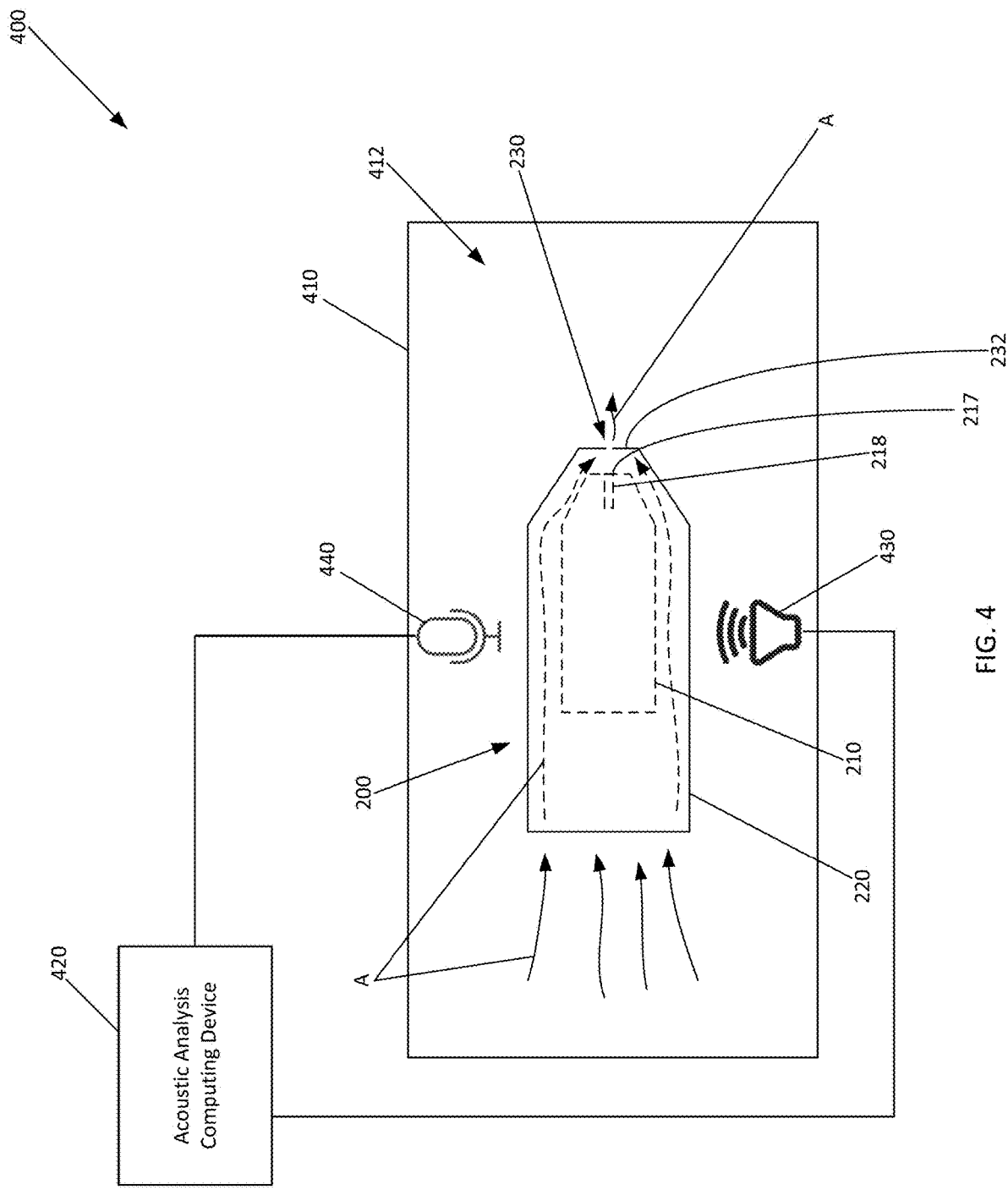
FIG. 4 illustrates a schematic diagram of a first embodiment of an acoustic analysis environment/apparatus configured to perform a spectral acoustic analysis of the embodiment of the consumable assembly illustrated in FIG. 2, and in accordance with the present invention.

Turning to FIG. 4, and with continued reference to FIGS. 2 and 3, illustrated is a first embodiment of an acoustic analysis environment or apparatus 400. The acoustic analysis apparatus 400 may include an enclosure 410 and an acoustic analysis computing device 420. The enclosure 410 may define an interior cavity 412 that may be configured to receive a consumable assembly 200 or may be configured to receive an entire torch 150 (with consumable assembly 200). The acoustic analysis apparatus 400 may further include an acoustical output generating device 430 and an acoustical capturing device 440 that may be disposed within the enclosure 410. The acoustical output generating device 430 and the acoustical capturing device 440 may both be connected to the acoustic analysis computing device 420. The acoustical output generating device 430 may be any type of speaker or audio output generating device that is configured to generate a controlled sound signal that is sweeps through frequencies and/or waveforms (e.g., sinusoidal, square, triangle, sawtooth, etc.). Furthermore, the acoustical output generating device 430 may be configured to generate any type of acoustical output, such as, but not limited to, audible outputs and inaudible outputs. The acoustical capturing device 440 may be any type of microphone or other type of audio capturing device (e.g., a capacitive electret) that is configured to capture the outputs generated by the acoustical output generating device 430 after/as the outputs interact with the consumable assembly 200. In some further embodiments, the acoustical output generating device 430 and/or the acoustical capturing device 440 may be in acoustic continuity with the consumable assembly 200, which may define a control volume.

As explained in further detail below, the acoustic analysis apparatus 400 may be configured to perform a spectral audio analysis of the control volume, or consumable assembly 200, in order to determine the degree of degradation or wear condition of the consumable assembly 200. The acoustic analysis apparatus 400 may be able to treat the space bounded by the electrode 210 and the nozzle 220 of the consumable assembly 200 as a control volume geometry of a specific set of resonance frequencies (e.g., audible and/or inaudible frequencies). The acoustic analysis computing device 420 may be configured to cause the acoustical output generating device 430 to generate a controlled audio signal that sweeps through sinusoidal frequencies, while simultaneously recording or logging the data associated with the acoustic signals captured by the acoustical capturing device 440. The data logged by the acoustic analysis computing device 420 may span across a specific range of frequencies and an associated amplitude for each frequency. The amplitudes of the logged acoustic signals may excite/increase when passing through a resonance frequency of the control volume (i.e., the consumable assembly 200). The acoustic analysis computing device may perform this analysis of a new unused consumable assembly 200 in order to establish a resonant signature, or baseline, for a specific consumable assembly 200 model. As the consumable assembly 200 wears, the electrode 210 and the surrounding nozzle 220 may become worn, and the geometry (e.g., control volume) of the consumable assembly 200 may change (i.e., the end face 216 and emissive insert 218 of the electrode 210 and the second opening or orifice 230 of the nozzle 220, specifically), which may cause the resonant response signature of the consumable assembly 200 to change. This change in resonance response can be detected by means of running the spectral audio analysis or consumable wear detection procedure described below prior to each cut performed by the consumable assembly 200, and then correlating the trajectory within the resultant frequency domain to a specific rate/degree of degradation or wear condition of the consumable assembly 200. Once a full spectral audio dataset has been formed for a consumable assembly 200, the spectral audio analysis or consumable wear detection procedure may be performed at any given time on a consumable assembly 200 of the same model in order to determine the degree of degradation or wear condition of the specific consumable assembly 200 being tested.

In some instances, the resonance frequency of the control volume (i.e., geometry of the consumable assembly 200 within the torch) may be impacted due to defects such as, but not limited to, misalignment of consumable assembly 200 parts or the consumable assembly 200 within the torch, gas pressure variances, material or surface defects in machined parts of the consumable assembly 200, coolant flow variances, gantry vibration, improper cut parameters for the consumable assembly 200, etc. The acoustic analysis computing device may perform this analysis of a new unused consumable assembly 200 in order to establish a resonant signature for a specific consumable assembly 200 and compare it to a baseline resonant signature to determine whether the specific consumable assembly 200 or torch has a defect. In some implementations, the resonant signature of the specific consumable assembly 200 may be compared to a plurality of resonant signatures to determine the particular defect of the consumable assembly 200 and/or torch. For example, each resonant frequency of the plurality of resonant signatures may be indicative of a separate defect. That is, a predetermined resonant signature may be determined for each defect for each consumable assembly 200 model and stored in a dataset for later comparison to a consumable assembly 200. Based on the comparison, the acoustic analysis computing device may determine the defect, if present, of the specific consumable assembly 200 based on its resonant signature.

In another embodiment, either in addition to generating an output with the acoustical output generating device 430, or in place of generating an output with the acoustical output generating device 430, the ramp up of the pre-cut gas flow A through the consumable assembly 200 may be utilized as a high bandwidth frequency sweep since it induces an acoustic response as the gas A flows over the internal surface of the nozzle 220, the surfaces of the electrode 210, and through the orifice 230 of the nozzle 220. Similar to the spectral audio analysis performed for when the controlled audio signal is generated by the acoustical output generating device 430, the gas flow A through the consumable assembly 200 can be swept and the internal geometry of the consumable set an be characterized based on an acoustic response captured via the acoustical capturing device 440. Therefore, geometric/volume/surface changes, and thus changes in resonance frequencies of the consumable assembly 200 from the wear/degradation/defect of the consumable assembly 200 may be identified, if present, via a Fourier analysis or other means of transformation.

Figure 5:
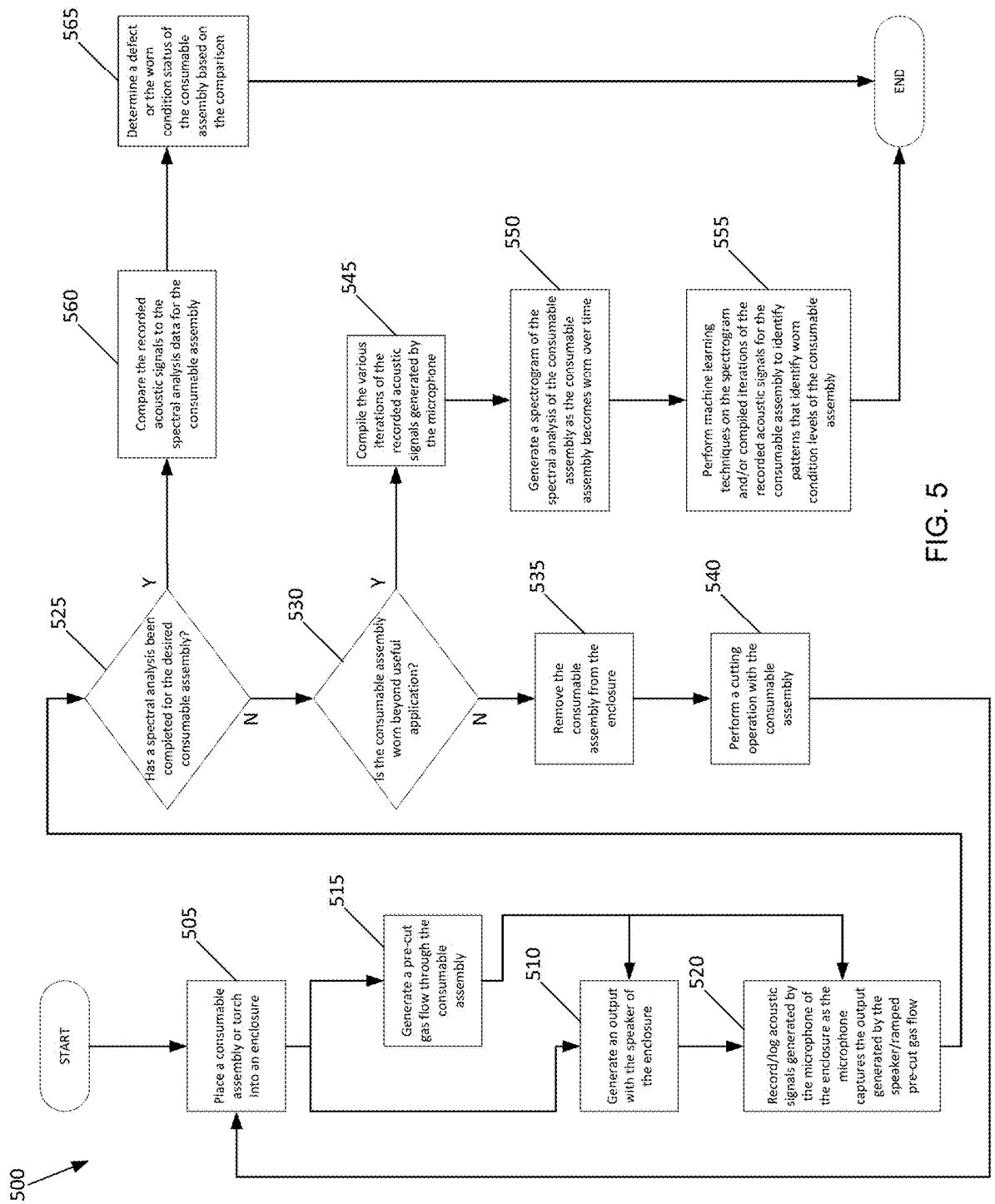
FIG. 5 illustrates a flowchart of the first embodiment of the method performed by the acoustic analysis apparatus illustrated in FIG. 4 when performing a spectral audio analysis of a consumable assembly.

Turning to FIG. 5, and with continued reference to FIGS. 2-4, illustrated is flowchart of an example method 500 for performing the spectral audio analysis of a consumable assembly 200 in order to acquire a full spectral audio analysis dataset of the possible defects of a consumable assembly 200 installed in a torch and the wear/degradation levels of a consumable assembly 200 over the life of the consumable assembly 200, and for determining a specific wear/degradation level of the consumable assembly for which a full spectral audio analysis dataset has previously been acquired. The method 500 is described with reference to the consumable assembly 200 and apparatus 400 by way of example only. Thus, the method 500 may be performed for any consumable assembly and may utilize any apparatus configured to perform the spectral audio analysis.

Initially, at 505, a consumable assembly 200 or the entire torch 150 may be placed within the interior cavity 412 of the enclosure 410. Depending on the embodiment, the method 500 may proceed to either step 510 or step 515. In one embodiment, at 510, the acoustic analysis computing device 420 may cause the acoustical output generating device 430 to generate an audio output (e.g., audible and/or inaudible soundwaves/frequencies) that is directed at the consumable assembly 200 disposed within the enclosure 410. As previously explained, this audio output may be a controlled sound signal that sweeps through sinusoidal frequencies. In another embodiment, at 515, a velocity or pressure of the pre-cut gas A may be ramped up to flow through the consumable assembly 200. Further depending on the embodiment, as the pre-cut gas flow A is ramped up at 515, the acoustic analysis computing device 420 may also, at 510, cause the acoustical output generating device 430 to generate an audio output directed at the consumable assembly 200. After the acoustic analysis computing device 420 causes the acoustical output generating device 430 to generate an audio output and/or after the pre-cut gas flow A has begun to flow through the consumable assembly 200, at 520, the acoustic analysis computing device 420 may log or record acoustic signals captured by the acoustical capturing device 440. The signals generated by the acoustical capturing device 440, and logged by the acoustic analysis computing device 420, may be later utilized to plot a chart of frequency vs. amplitude, like that illustrated in FIG. 6A.

At 525, the acoustic analysis computing device 420 determines whether or not a full spectral audio analysis has been previously completed for the consumable assembly 200 disposed within the enclosure 410 (i.e., does a full wear/degradation acoustic dataset exist for the consumable assembly 200 disposed within the enclosure 410). If the acoustic analysis computing device 420 has not completed a full spectral audio analysis, then, at 530, the acoustic analysis computing device 420 determines whether or not the consumable assembly 200 is worn beyond its useful application (i.e., whether or not the consumable assembly 200 is capable of performing a cut operation of a satisfactory quality). This may be determined from feedback from the user and/or calculated based on a known number of cuts previously performed with the consumable assembly 200 (i.e., by knowing how many cuts have previously been performed by the consumable assembly 200 in the enclosure 410 and by knowing the number of cuts typically capable of being performed by the model of the consumable assembly 200 before the quality of the cuts are no longer deemed acceptable by a user). If, at 530, the acoustic analysis computing device 420 determines that the consumable assembly is not worn or degraded beyond its useful application, then, at 535, the user removes the consumable assembly 200 from the enclosure 410 and, at 540, performs a cutting operation with the consumable assembly 200. The method 500 then returns to step 505 and continues with this loop of steps 505, 510, 515, 520, 525, 530, 535, 540 to continuously record/log the signals captured by the acoustical capturing device 440 as the consumable assembly 200 continues to degrade and wear from successive cut operations.

However, if, at 530, the consumable assembly 200 has been fully degraded/worn to a condition that the consumable assembly 200 is no longer capable of performing cut operations that are deemed acceptable by a user, the method 500 proceeds to 545, where the acoustic analysis computing device 420 compiles the various iterations of the recorded acoustic signals that were generated by the acoustical capturing device 440. When compiling the various iterations, the acoustic analysis computing device 420 may generate a spectrogram (see FIG. 6B) from of each iteration's frequency domain plot or Bode plot 600, like that illustrated in FIG. 6A, where frequency 610 is presented along the x-axis and amplitude 620 is presented along the y-axis.

As illustrated in FIG. 6A, the Bode plot 600 presents each iteration 630(1)-630(N) of the acoustic signals that were generated by the acoustical capturing device 440 such that the various iterations 630(1)-630(N) are overlaid one another (each iteration may be plotted in a different shading or color). In the illustrated embodiment of the Bode plot 600, iteration 630(1) may be the first acoustic signal generated and captured by the acoustical capturing device 440, which contains the resonant response frequencies of a new and unworn consumable assembly 200 (e.g., the baseline acoustical profile of the consumable assembly 200). Furthermore, iteration 630(N) may be an acoustic signal generated and captured by the acoustical capturing device 440 after a number N of successive cut operation performed by the consumable assembly 200, and, thus, contains the resonant response frequencies of a more worn/degraded consumable assembly 200 when compared to that of iteration 630(1). Additional iterations may be acoustical signals generated and captured by the acoustical capturing device 440 corresponding to one or more defects in the consumable assembly 200 and/or torch (e.g., such as, but not limited to, determining misalignment of parts, improper installation of the consumable assembly in a torch, gas pressure variances, material or surface defects in machined parts of the consumable assembly, coolant flow variances, gantry vibration, etc.).

Figure 6B:
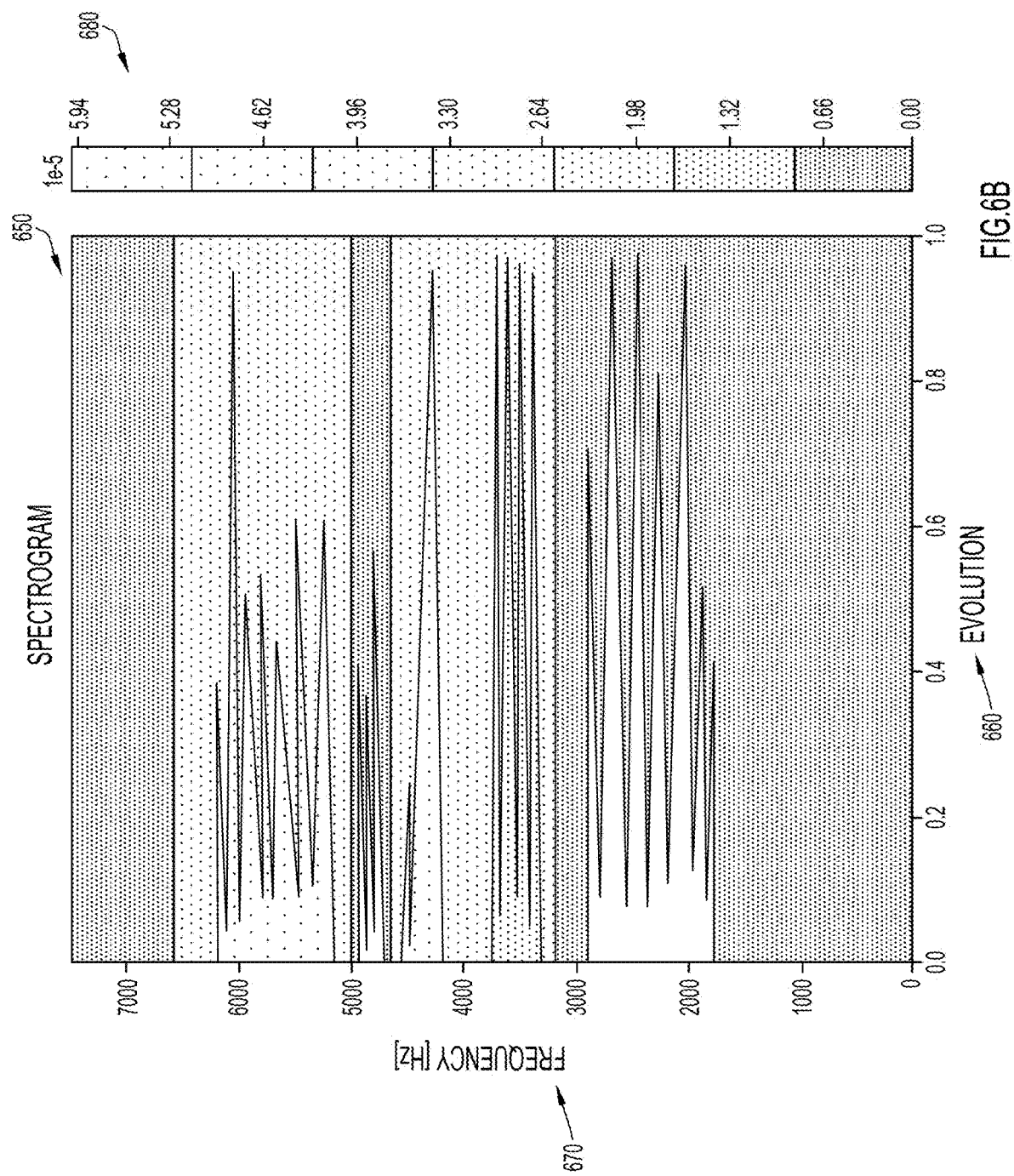
FIG. 6B illustrates a spectrogram generated by the acoustic analysis computing device illustrated in FIG. 4, the spectrogram representing the variations of the amplitudes of various frequencies shown in the frequency domain chart of FIG. 6A for a consumable assembly over a the useful lifespan of the consumable assembly.

At 550, the acoustic analysis computing device 420 may then generate, from the compiled iterations of the acoustic signals generated by the acoustical capturing device 440 and/or the Bode plots 600, a spectrogram 650 (an embodiment of which is illustrated in FIG. 6B). The spectrogram 650 may present the iteration/evolution of the consumable 660 along the x-axis, and may present the frequency 670 along the y-axis. The spectrogram 650 may further present the amplitude of the frequencies via color/shading, a key to which is presented by the color/shading bar 680 on the right hand side of the spectrogram 650. In some embodiments, a third axis could also be used to generate a surface map (e.g., X-axis corresponding to a number of cuts performed by a particular consumable assembly, Y-axis correspond to frequency, Z-axis corresponding to amplitude). As depicted in the example embodiment of the spectrogram 650 illustrated in FIG. 6B, which represents a full spectral audio analysis dataset of an example consumable assembly 200, the frequencies with the greater amplitudes occur approximately between 3200 Hz and 6600 Hz. As further depicted in the embodiment of the spectrogram 650 illustrated in FIG. 6B, the frequencies shift and the amplitudes of these frequencies decrease as the consumable assembly 200 becomes more worn/degraded.

Returning to FIG. 5, at 555, the acoustic analysis computing device 420 may utilize artificial intelligence or machine learning models to perform machine learning techniques on the spectrogram 650, the Bode plot 600, and/or the compiled iterations of the recorded acoustic signals for the consumable assembly 200 to identify patterns that represent defect(s) and/or worn/degraded condition levels for the consumable assembly 200. The artificial intelligence or machine learning models may be trained with data sets including various spectrograms, Bode plots, recorded acoustic signals, and their associations with consumable assembly wear/degradation levels and/or defect(s). The artificial intelligence or machine learning models may include any quantity of any type of machine learning models (e.g., feed-forward, recurrent, or other neural networks, classifiers, etc.) that are capable of receiving a spectrogram and/or acoustic signals, and that are capable of producing or indicating patterns representing the wear/degradation levels of a consumable assembly. The artificial intelligence or machine learning models may enable the acoustic analysis computing device 420 to determine pre-learned/pre-defined patterns that are associated with the wear conditions or degree of degradation of various consumable assemblies. In some embodiments, the recorded acoustic signals of a consumable assembly may be compared to the determined pre-defined patterns and/or the generated spectrogram to determine the wear condition or degree of degradation of a consumable assembly. The machine learning models may be trained with data sets including various recorded acoustic signals, corresponding spectrograms, and corresponding wear/degradation levels of various consumable assemblies to learn the associations. The machine learning models may be further trained with data sets that include pre-defined acoustic signals and associated training wear/degradation levels in order to learn pattern comparisons.

With continued reference to FIG. 5, and returning to step 525, if a full spectral audio analysis has been previously completed for the consumable assembly 200 disposed within the enclosure 410 (i.e., the acoustic analysis computing device 420 contains a full wear/degradation acoustic dataset for the consumable assembly 200 disposed within the enclosure 410), then, at 560, the acoustic analysis computing device 420 may compare the recorded acoustic signals to the spectral audio analysis data for the consumable assembly 200. This comparison may be performed by the artificial intelligence or machine learning models of the acoustic analysis computing device 420. At 565, the acoustic analysis computing device 420 may further determine the wear/degradation level of the consumable assembly 200 and/or defect(s), if present, based on the comparison at 560. The determination of the defect(s), if present, and wear/degradation level of the consumable assembly 200 disposed within the enclosure 410 may also be performed by the artificial intelligence or machine learning models of the acoustic analysis computing device 420.

Figure 7:
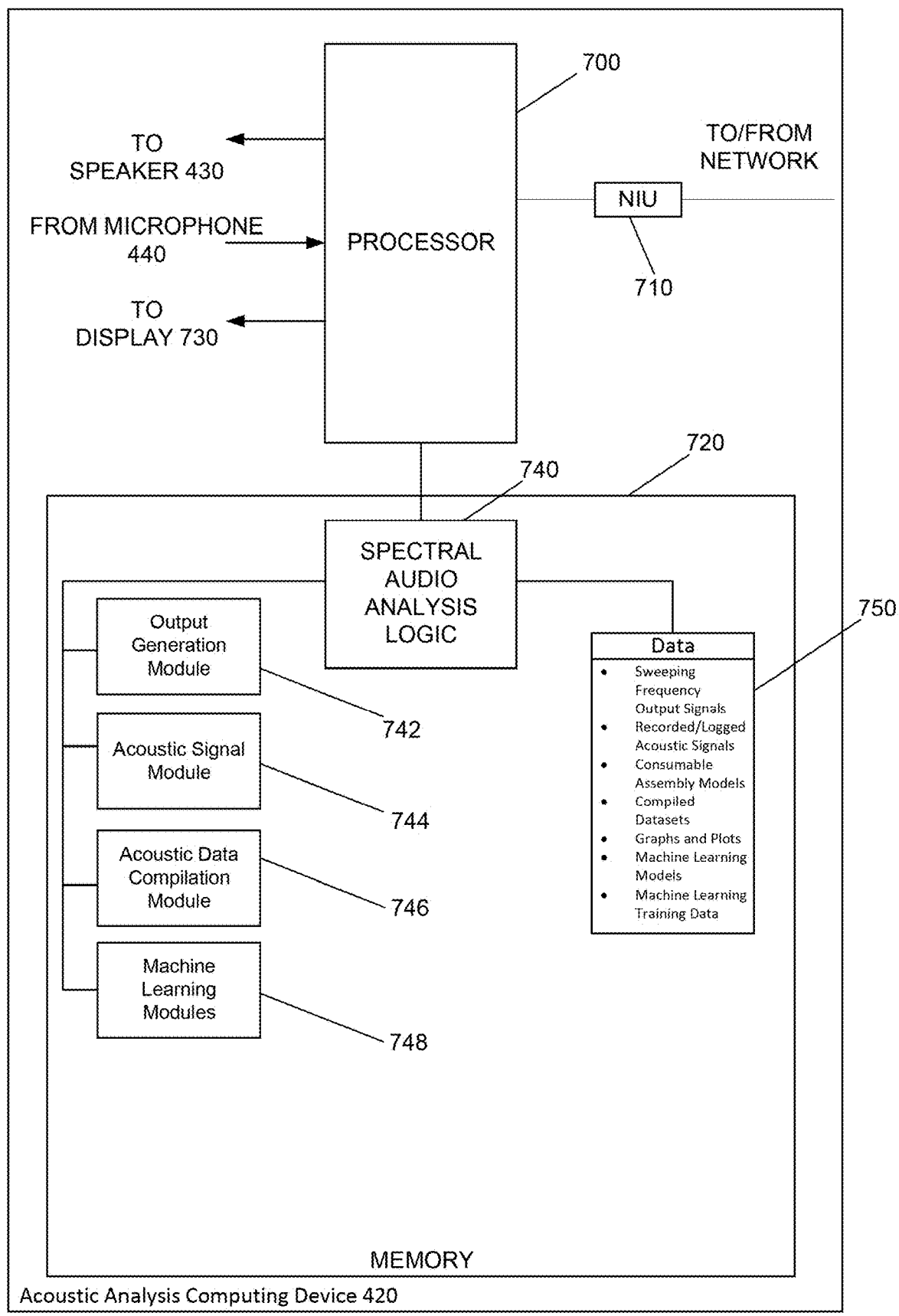
FIG. 7 illustrates a schematic representation of the acoustic analysis computing device illustrated in FIG. 4.

Turning to FIG. 7, and with continued reference to FIGS. 2-5, 6A, and 6B, illustrated is an example block diagram of the acoustic analysis computing device 420 of the acoustic analysis apparatus 400 configured to perform the techniques for determining the wear/degradation levels of a consumable assembly 200 through an acoustical analysis/spectral audio analysis in accordance with the embodiments described herein. There are numerous possible configurations for the acoustic analysis computing device 420 and FIG. 7 is meant to be an example. The acoustic analysis computing device 420 may include a processor 700, a network interface unit 710, and memory 720. The network interface (I/F) unit (NIU) 710 may be, for example, an Ethernet card or other interface device that allows the acoustic analysis computing device 420 to communicate over a communication network. The network I/F unit 710 may include wired and/or wireless connection capability.

Processor 700 may include a collection of microcontrollers and/or microprocessors, for example, each configured to execute respective software instructions stored in the memory 720. The collection of microcontrollers may include, for example: a display controller to receive, send, and process display signals related to a display 730 connected to the acoustic analysis computing device 420; an audio processor to receive, send, and process acoustic signals related to acoustical output generating devices 430 and acoustical capturing device 440; and a high-level controller to provide overall control. Portions of memory 720 (and the instructions therein) may be integrated with processor 700.

The memory 720 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 720 may comprise one or more computer readable storage media (e.g., a memory device) encoded with software comprising computer executable instructions and when the software is executed (by the processor 700) it is operable to perform the operations described herein. For example, the memory 720 stores or is encoded with instructions for spectral audio analysis logic 740 that facilitate the generation of a full dataset of the wear/degradation levels of various consumable assembly models, and that facilitate the specific recognition of the wear/degradation level for a consumable assembly. Spectral audio analysis logic 740 may include an output generation module 742 configured to cause the acoustical output generating device 430 to generate an audio output that sweeps through sinusoidal frequencies, a acoustic signal module 744 configured to cause the acoustical capturing device 440 to detect the outputs from the acoustical output generating device 430 and/or pre-cut gas flow A through the consumable assembly 200 and generate an acoustic signal that may be recorded or logged by the acoustic analysis computing device 420, an acoustic data compilation module 746 configured enable the acoustic analysis computing device 420 to compile the acoustic signals generated by the acoustical capturing device 440 for each wear iteration of the consumable assembly 200, while also being configured to enable the acoustic analysis computing device 420 to generate a Bode plot 600 and a spectrogram 650 for each consumable assembly 200, and machine learning modules 748 that are configured to identify patterns in the compiled datasets, as well as determine wear/degradation levels of a consumable assembly 200 based on a recorded acoustic signal by the acoustical capturing device 440.

In addition, memory 720 stores data 750 used and generated by logic/modules 740-748, including, but not limited to: sweeping frequency output signals; recorded/logged acoustic signals; consumable assembly models; compiled acoustic datasets; graphs and plots; machine learning models; machine learning training data; etc.

Figure 8:
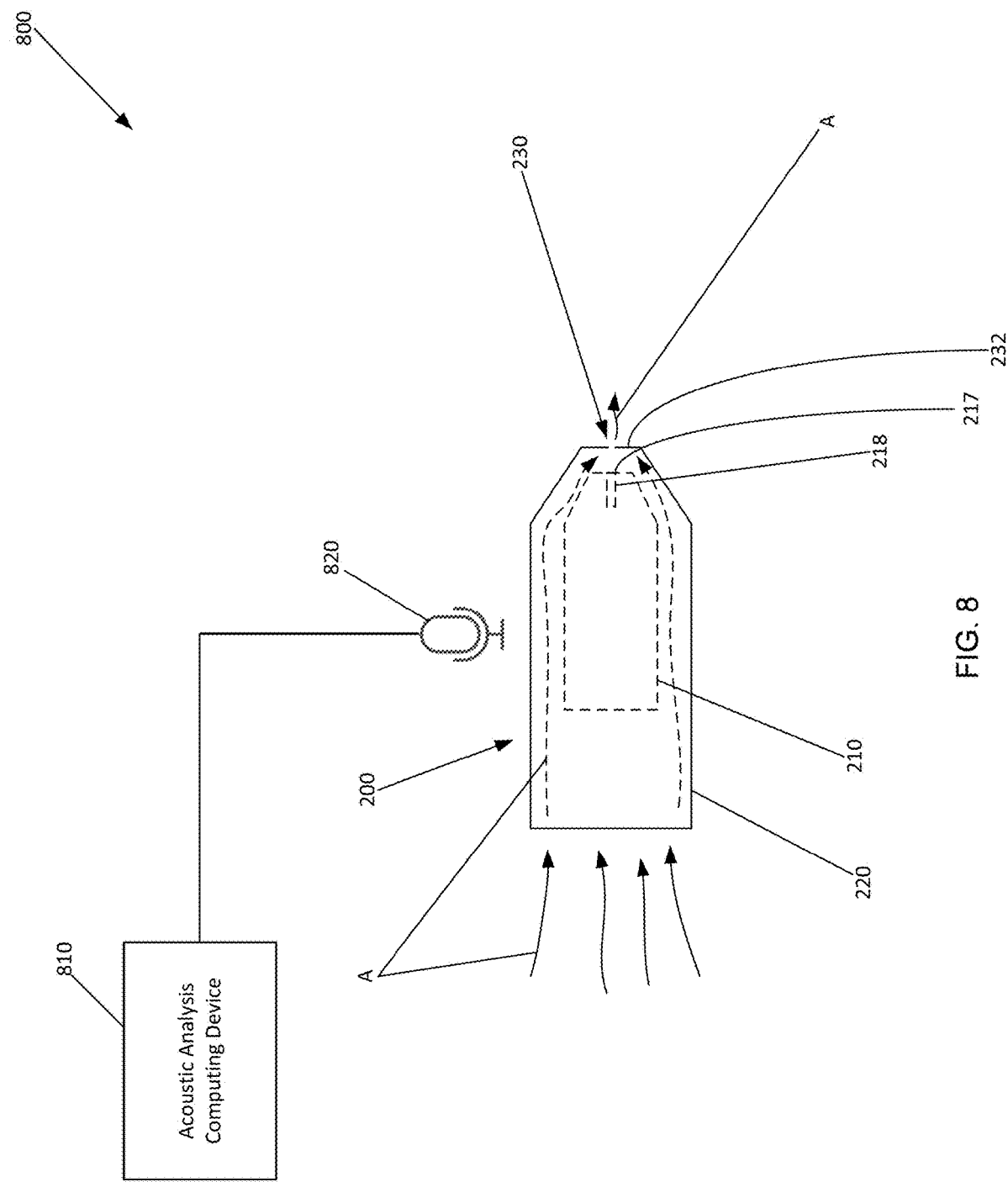
FIG. 8 illustrates a schematic diagram of a second embodiment of an acoustic analysis environment/apparatus configured to perform a spectral audio analysis of the embodiment of the consumable assembly illustrated in FIG. 2, and in accordance with the present invention.

Turning to FIG. 8, and with continued reference to FIGS. 2 and 3, illustrated is another embodiment of an acoustic analysis environment or apparatus 800. The acoustic analysis apparatus 800 may include an acoustic analysis computing device 810 and an acoustical capturing device 820 that may be connected to the acoustic analysis computing device 810. The acoustical capturing device 820 may be any type of device that, as explained in further detail below, is configured to capture audio outputs (e.g., audible and/or inaudible soundwaves/frequencies) generated by pre-cut gas flow A through the consumable assembly 200 (such as, but not limited to a microphone or other types of audio capturing devices (e.g., a capacitive electret)). The acoustical capturing device 820 may be repositionable such that it may be placed in proximity to the consumable assembly 200. In other embodiments, the acoustical capturing device 820 may be positioned at a location that is spaced from to the consumable assembly 200.

As explained in further detail below, the acoustic analysis apparatus 800 may be configured to perform an acoustical analysis or spectral audio analysis of the consumable assembly 200 in order to determine the degree of degradation or wear condition of the consumable assembly 200. The acoustic analysis apparatus 800 may be able to treat the space bounded by the electrode 210 and the nozzle 220 of the consumable assembly 200 (i.e., internal volume) as a control volume of a specific resonance frequency. The acoustic analysis computing device 810 may be configured to record or log the data associated with the acoustic signals (e.g., audible and/or inaudible soundwaves/frequencies) captured by the acoustical capturing device 820 as a pre-cut gas flow A passes or flows through the consumable assembly 200. A ramping up of the pre-cut gas A through the consumable assembly 200 may be utilized as a high noise frequency sweep since it induces an acoustic energy as the gas A flows over the internal surface of the nozzle 220, the surfaces of the electrode 210, and through the orifice 230 of the nozzle 220. The data logged by the acoustic analysis computing device 810 may span across a specific range of frequencies and an associated amplitude for each frequency. The amplitude of the logged acoustic signals may increase when passing through the resonance frequency of the control volume (i.e., the consumable assembly 200). The acoustic analysis computing device 810 may perform this analysis of a new unused consumable assembly 200 in order to establish a datum frequency, or baseline, for a specific consumable assembly 200 model or type. As the consumable assembly 200 wears, the electrode 210 and the surrounding nozzle 220 may become worn, and the geometry of the consumable assembly 200 may change (i.e., the end face 216 and emissive insert 218 of the electrode 210 and the second opening or orifice 230 of the nozzle 220, specifically), which may cause the resonance frequency of the consumable assembly 200 to change from the baseline. This change in the resonance frequency can be detected by means of running the spectral audio analysis or consumable wear detection procedure described below prior to each cut performed by the consumable assembly 200, and then correlating the trajectory within the resultant frequency domain to a specific degree of degradation or wear condition of the consumable assembly 200. Once a full spectral audio dataset has been formed for a consumable assembly 200, the spectral audio analysis or consumable wear detection procedure may be performed at any time on a specific consumable assembly 200 of the same model or type in order to determine the degree of degradation or wear condition of the specific consumable assembly 200 being tested.

Figure 9:
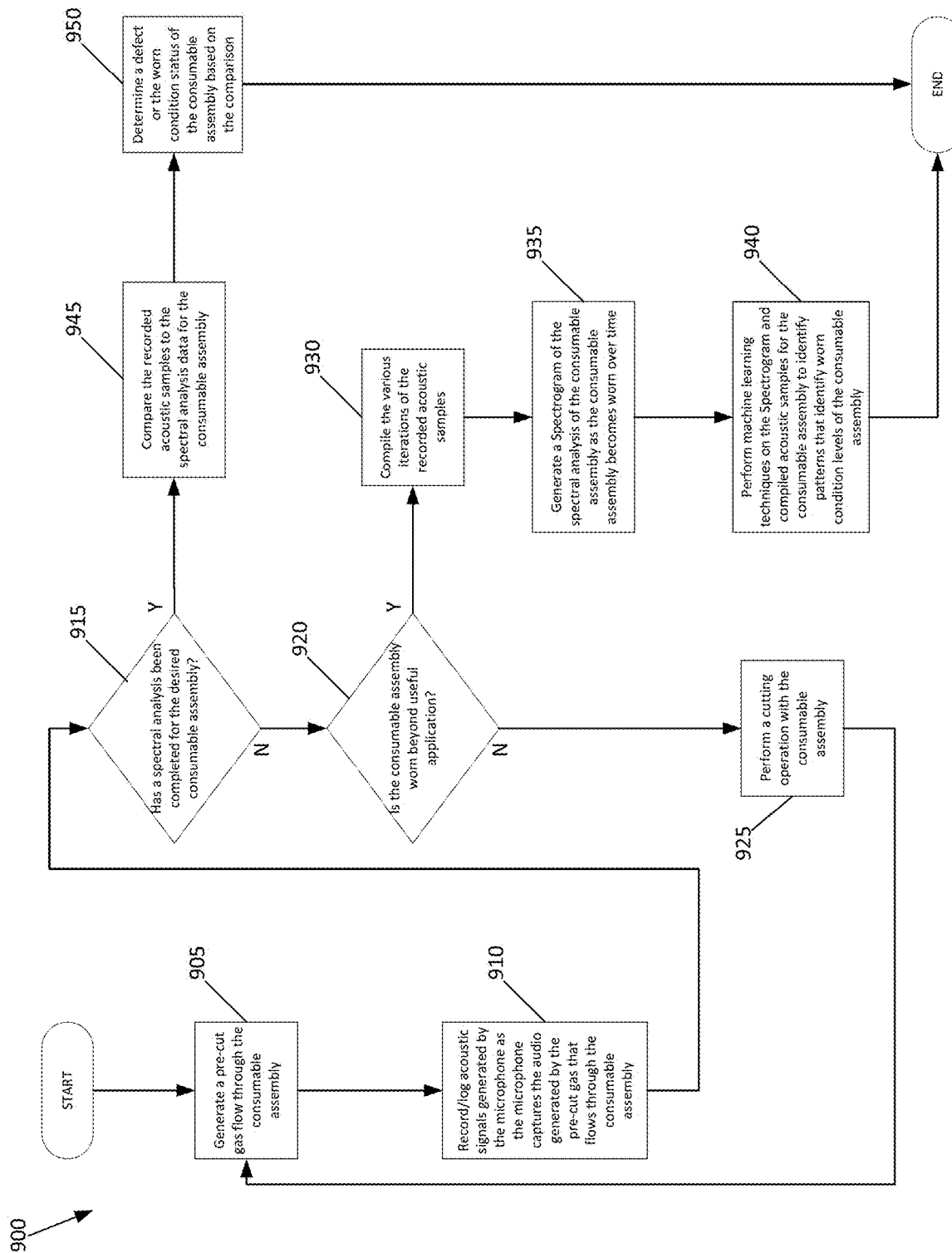
FIG. 9 illustrates a flowchart of the second embodiment of the method performed by the acoustic analysis apparatus illustrated in FIG. 8 when performing a spectral audio analysis of a consumable assembly.

Turning to FIG. 9, and with continued reference to FIGS. 2, 3, 6A, 6B, and 8, illustrated is flowchart of an example method 900 for performing the acoustic analysis or spectral audio analysis of a consumable assembly 200 in order to either acquire a full spectral audio dataset of the possible defects of a consumable assembly 200 and/or torch and the wear condition or degree of degradation of a consumable assembly 200, or to determine the wear condition or degree of degradation of a consumable assembly 200 for which a full spectral audio analysis dataset has previously been acquired. The method 900 is described with reference to the consumable assembly 200 and apparatus 800 by way of example only. Thus, the method 900 may be performed for any consumable assembly and may utilize any apparatus configured to perform the acoustic analysis/spectral audio analysis.

Initially, at 905, a pre-cut gas flow A may be ramped up to flow through the consumable assembly 200. As the pre-cut gas flow A is ramped up, at 910, the acoustic analysis computing device 810 may log or record acoustic signals captured by the acoustical capturing device 440. The signals generated by the acoustical capturing device 820, and logged by the acoustic analysis computing device 810, may be utilized to plot a chart of frequency vs. amplitude, like that previously described and illustrated in FIG. 6A.

At 915, the acoustic analysis computing device 810 determines whether or not a full spectral audio analysis has been previously completed for the consumable assembly 200 model or type (i.e., does a full wear/degradation spectral audio dataset exist for the consumable assembly 200 model or type). If the acoustic analysis computing device 810 has not completed a full spectral audio analysis, then, at 920, the acoustic analysis computing device 810 determines whether or not the consumable assembly 200 is worn beyond its useful application (i.e., whether or not the consumable assembly 200 is capable of performing a cut operation of a satisfactory quality). This may be determined from feedback from the user and/or calculated based on a known number of cuts previously performed with the consumable assembly 200 (i.e., by knowing how many cuts have previously been performed by the consumable assembly 200 and by knowing the number of cuts typically capable of being performed by the model of the consumable assembly 200 before the quality of the cuts are no longer deemed acceptable by a user). If, at 920, the acoustic analysis computing device 810 determines that the consumable assembly 200 is not worn or degraded beyond a useful application, then, at 925, the user performs a cutting operation with the consumable assembly 200. The method 900 then returns to step 905 and continues with this loop of steps 905, 910, 915, 920, 925 to continuously record/log the acoustic signals captured by the acoustical capturing device 820 as the consumable assembly 200 continues to degrade and wear from successive cut operations.

If, at 920, the consumable assembly 200 has been fully degraded/worn to the point that it no longer performs cut operations that are deemed acceptable by a user, or includes a defect, the method 900 proceeds to 930, where the acoustic analysis computing device 810 compiles the various iterations of the recorded acoustic signals that were generated by the acoustical capturing device 820. When compiling the various iterations, the acoustic analysis computing device 810 may generate a frequency domain plot or Bode plot 600, like that previously described and illustrated in FIG. 6A, where the various iterations 630(1)-630(N) are overlaid one another.

At 935, the acoustic analysis computing device 810 may then generate, from the compiled iterations of the acoustic signals generated by the acoustical capturing device 820 and/or the Bode plot 600, a spectrogram 650 (an example embodiment of which was previously described and is illustrated in FIG. 6B). As explained previously the spectrogram 650 may present the changes in the amplitude of the various frequencies over the evolution/life of the consumable assembly 200 (i.e., as the consumable assembly becomes more worn/degrades).

Continuing with FIG. 9, at 940, the acoustic analysis computing device 810 may utilize artificial intelligence or machine learning models to perform machine learning techniques on the spectrogram 650, the Bode plot 600, and/or the compiled iterations of the recorded acoustic signals for the consumable assembly 200 to identify patterns that represent worn/degraded condition levels for the consumable assembly 200 and/or one or more defects. The artificial intelligence or machine learning models may be trained with data sets including various spectrograms, Bode plots, recorded acoustic signals, and their associations with consumable assembly wear/degradation levels and/or one or more defects of the consumable assembly. The artificial intelligence or machine learning models may include any quantity of any type of machine learning models (e.g., feed-forward, recurrent, or other neural networks, classifiers, etc.) that are capable of receiving a spectrogram and/or acoustic signals, and that are capable of producing or indicating patterns representing the possible defects of a consumable assembly and/or the torch and the wear/degradation levels of a consumable assembly. The artificial intelligence or machine learning models may enable the acoustic analysis computing device 420 to determine pre-learned/pre-defined patterns that are associated with the wear conditions or degree of degradation of various consumable assemblies and/or possible defects of a consumable assembly and/or the torch. In some embodiments, the recorded acoustic signals of a consumable assembly may be compared to the determined pre-defined patterns and/or the generated spectrogram to determine the wear condition or degree of degradation of a consumable assembly and/or defects of consumable assembly and/or torch. The machine learning models may be trained with data sets including various recorded acoustic signals, corresponding spectrograms, and corresponding defects of a consumable assembly and/or torch, and/or corresponding wear/degradation levels of various consumable assemblies to learn the associations. The machine learning models may be further trained with data sets that include pre-defined acoustic signals and associated training wear/degradation levels in order to learn pattern comparisons.

With continued reference to FIG. 9, and returning to step 915, if a full spectral audio analysis has been previously completed for the consumable assembly 200 (i.e., the acoustic analysis computing device 810 contains a full wear/degradation spectral dataset for the consumable assembly 200, or a consumable assembly of a same type or model of the consumable assembly 200), then, at 945, the acoustic analysis computing device 810 may compare the recorded acoustic signals to a criteria (e.g., the spectral audio analysis data for the consumable assembly 200, or the consumable assembly of the same type or model of the consumable assembly 200). This comparison may be performed by the artificial intelligence or machine learning models of the acoustic analysis computing device 810. At 950, the acoustic analysis computing device 810 may determine possible defects of a consumable assembly 200 within the torch and the wear/degradation level of the consumable assembly 200 based on the comparison at 945. The determination of the possible defects of a consumable assembly 200 within the torch and the wear/degradation level of the consumable assembly 200 may also be performed by the artificial intelligence or machine learning models of the acoustic analysis computing device 810.

In response to determining the consumable assembly 200 has a defect and/or is worn beyond its useful application, the user may replace it with a new consumable assembly of the same model or type. Further, the in response to determining a defect in the installation of consumable assembly 200 within the torch and/or the setting of one or more the parameters of the cutting operation, a user may cure the defect (e.g., reinstall the consumable assembly 200 and/or reset a cutting parameter) before cutting a workpiece. Accordingly, the method 900 for performing the acoustic analysis or spectral audio analysis of a consumable assembly 200 prevents a user from having to perform a cutting operation on a workpiece to determine whether the consumable assembly 200 is worn, the consumable assembly 200 and/or torch have a defect, and/or the consumable assembly 200 install in a torch is otherwise unsuitable for performing the cutting operation. Alternatively, in response to determining the consumable assembly 200 is not worn beyond its useful application, a user may forego a preemptive replacement of the consumable assembly 200 and continue to perform a cutting operation with the consumable assembly 200 without risking a poor cut quality. Consequently, waste from prematurely discarded consumable assemblies 200 and scrapped workpieces due to poor cut quality may be significantly reduced using the techniques described herein.

Figure 10:
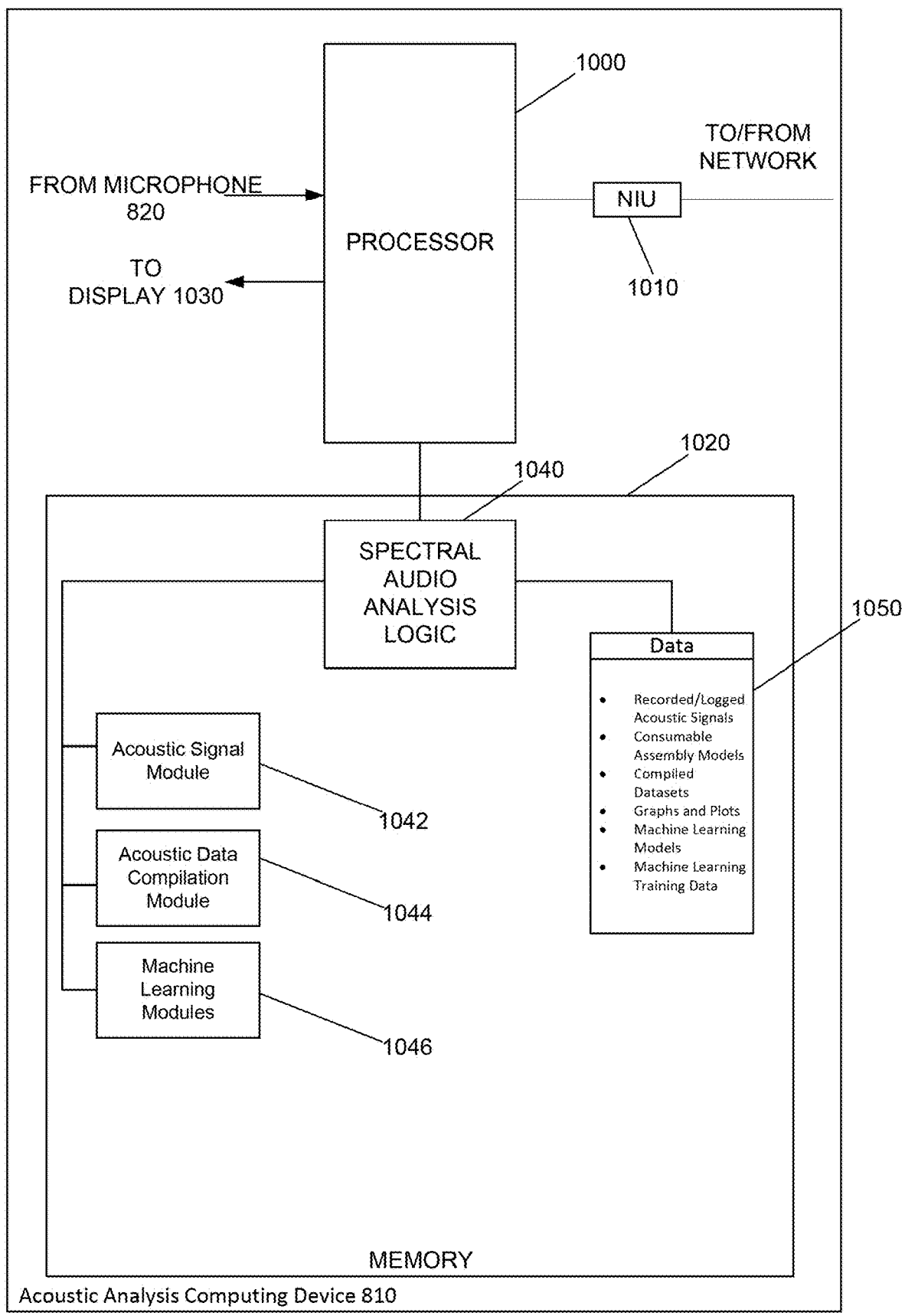
FIG. 10 illustrates a schematic representation of the acoustic analysis computing device illustrated in FIG. 8.

Turning to FIG. 10, and with continued reference to FIGS. 2, 3, 6A, 6B, 8 and 9, illustrated is an example block diagram of the acoustic analysis computing device 810 of the acoustic analysis apparatus 800 configured to perform the techniques for determining the wear/degradation levels of a consumable assembly 200 through an acoustical analysis/ spectral audio analysis in accordance with the embodiments described herein. There are numerous possible configurations for the acoustic analysis computing device 810 and FIG. 10 is meant to be an example. The acoustic analysis computing device 810 may include a processor 1000, a network interface unit 1010, and memory 1020. The network interface (I/F) unit (NIU) 1010 may be, for example, an Ethernet card or other interface device that allows the acoustic analysis computing device 810 to communicate over a communication network. The network I/F unit 1010 may include wired and/or wireless connection capability.

Processor 1000 may include a collection of microcontrollers and/or microprocessors, for example, each configured to execute respective software instructions stored in the memory 1020. The collection of microcontrollers may include, for example: a display controller to receive, send, and process display signals related to a display 1030 connected to the acoustic analysis computing device 810; an audio processor to receive and process acoustic signals related to acoustical capturing device 820; and a high-level controller to provide overall control. Portions of memory 1020 (and the instructions therein) may be integrated with processor 1000.

The memory 1020 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 1020 may comprise one or more computer readable storage media (e.g., a memory device) encoded with software comprising computer executable instructions and when the software is executed (by the processor 1000) it is operable to perform the operations described herein. For example, the memory 1020 stores or is encoded with instructions for spectral audio analysis logic 1040 that facilitate the generation of a full dataset of the wear/degradation levels of various consumable assembly models, and that facilitate the specific recognition of the wear/degradation level for a consumable assembly. Spectral audio analysis logic 1040 may include an acoustic signal module 1042 configured to cause the acoustical capturing device 820 to detect the audio generated by the pre-cut gas A flows through the consumable assembly 200 and generate an acoustic signal that may be recorded or logged by the acoustic analysis computing device 810, an acoustic data compilation module 1044 configured enable the acoustic analysis computing device 810 to compile the acoustic signals generated by the acoustical capturing device 820 for each wear iteration of the consumable assembly 200, while also being configured to enable the acoustic analysis computing device 420 to generate a Bode plot 600 (like that illustrated in FIG. 6A) and a spectrogram 650 (like that illustrated in FIG. 6B) for each consumable assembly 200, and machine learning module(s) 1046 that are configured to identify patterns in the compiled datasets, as well as determine wear/degradation levels of a consumable assembly 200 based on a recorded acoustic signal by the acoustical capturing device 820.

In addition, memory 1020 stores data 1050 used and generated by logic/modules 1040-1046, including, but not limited to: recorded/logged acoustic signals; consumable assembly models; compiled acoustic datasets; graphs and plots; machine learning models; machine learning training data; etc.

While the embodiments disclosed herein may be utilized to determine the level of wear/degradation of a consumable assembly, the same apparatuses 400, 800 and methods 500, 900, respectively, may further be used to determine other patterns related to a consumable assembly and/or operations performed by the consumable assembly/torch including, but not limited to, gas pressure variances, material or surface defects in machined parts of the consumable assembly, coolant flow, gantry vibration, etc.

In some aspects, the techniques described herein relate to a system including: an acoustical capturing device; and an acoustic analysis processor configured to determine an amount of wear and/or a defect of a plasma torch consumable based on acoustic signals captured by the acoustical capturing device, wherein the acoustic signals are generated by the plasma torch consumable.

In some aspects, the techniques described herein relate to a system, wherein the acoustic analysis processor is further configured to compare the acoustic signals captured by the acoustical capturing device to a criteria.

In some aspects, the techniques described herein relate to a system, wherein the criteria is a plurality of iterations of acoustic signals generated by the acoustical capturing device, each iteration of the plurality of iterations being representative of an acoustic signal of the plasma torch consumable after a set number of cuts has been performed by the plasma torch consumable.

In some aspects, the techniques described herein relate to a system, wherein the acoustic signals are iteratively captured after successive uses of the plasma torch consumable; and wherein the acoustic analysis processor is further configured to compile the acoustic signals into a spectrogram representative of wear levels of the plasma torch consumable over a life of the plasma torch consumable.

In some aspects, the techniques described herein relate to a system, wherein the acoustic analysis processor is configured to determine the amount of wear of the plasma torch consumable by comparing the captured acoustic signal to the spectrogram of the plasma torch consumable.

In some aspects, the techniques described herein relate to a system, further including an enclosure for receiving the acoustical capturing device and the plasma torch consumable.

In some aspects, the techniques described herein relate to a system, wherein the acoustic signals are generated via a gas flowing through an interior volume of the plasma torch consumable.

In some aspects, the techniques described herein relate to a method including: flowing a gas through an internal volume of a plasma torch consumable; detecting, via an acoustical capturing device, an acoustic signal generated by the gas flowing through the plasma torch consumable; and determining, via an acoustic analysis processor, an amount of wear and/or a defect of the plasma torch consumable based on the acoustic signal detected by the acoustical capturing device.

In some aspects, the techniques described herein relate to a method, wherein the acoustic signal is indicative of a size and/or a shape of the internal volume of the plasma torch consumable.

In some aspects, the techniques described herein relate to a method, further including outputting additional acoustic signals via an acoustical output generating device disposed within an enclosure receiving the plasma torch consumable and the acoustical capturing device.

In some aspects, the techniques described herein relate to a method, further including controlling the additional acoustic signals to sweep through a range of frequencies and/or waveforms.

In some aspects, the techniques described herein relate to a method, wherein detecting the acoustic signal includes capturing amplitudes of the acoustic signal over a range of frequencies and/or waveforms.

In some aspects, the techniques described herein relate to a method, further including performing analysis iterations of the plasma torch consumable to determine a spectral analysis of the plasma torch consumable over a life of the plasma torch consumable.

In some aspects, the techniques described herein relate to a method, wherein each analysis iteration includes: performing a cutting operation with the plasma torch consumable; detecting an iterative acoustic signal via the acoustical capturing device, the iterative acoustic signal being generated by flowing the gas through the plasma torch consumable after completion of the cutting operation; and determining whether the amount of wear of the plasma torch consumable has reached a predetermined amount of wear.

In some aspects, the techniques described herein relate to a method, wherein, upon determining that the plasma torch consumable has reached the predetermined amount of wear, the method further includes: compiling the iterative acoustic signals from the analysis iterations into a spectrogram via the acoustic analysis processor.

In some aspects, the techniques described herein relate to a method, wherein the detected acoustic signal is a first detected acoustic signal and the plasma torch consumable is a first plasma torch consumable, the method further including: comparing, via the acoustic analysis processor, a second detected acoustic signal of a second plasma torch consumable to the spectrogram to determine the amount of wear of the second plasma torch consumable.

In some aspects, the techniques described herein relate to a method, replacing the plasma torch consumable with a new consumable in response to determining that the plasma torch consumable has reached a predetermined amount of wear.

In some aspects, the techniques described herein relate to an apparatus including: a processor configured to: receive an input indicative of an acoustic signal generated by a plasma torch consumable and captured by an acoustical capturing device; compare the input to a spectrogram representative of various amounts of wear and/or a defect of the plasma torch consumable over a life of the plasma torch consumable; and determine an amount of wear of the plasma torch consumable based on the comparing.

In some aspects, the techniques described herein relate to an apparatus, wherein the spectrogram includes amplitudes of iterative acoustic signals over a range of frequencies and/or waveforms.

In some aspects, the techniques described herein relate to an apparatus, wherein the acoustic signal is generated by a flow of gas through the plasma torch consumable.

While the apparatuses and methods presented herein have been illustrated and described in detail and with reference to specific embodiments thereof, it is nevertheless not intended to be limited to the details shown, since it will be apparent that various modifications and structural changes may be made therein without departing from the scope of the inventions and within the scope and range of equivalents of the claims. For example, the acoustic analysis apparatuses presented herein may be modified to contain any number of acoustical output generating devices, acoustical capturing devices s, acoustic analysis computing devices, etc., and the acoustic analysis computing devices may connect to any number of input and output devices, along with any number of networks and/or servers. Additionally, the methods presented herein may be suitable for any type of welding and/or cutting consumable assemblies, including consumable assemblies utilized for automated (e.g., mechanized) and/or manual (e.g., handheld) operations.

In addition, various features from one of the embodiments may be incorporated into another of the embodiments. That is, it is believed that the disclosure set forth above encompasses multiple distinct inventions with independent utility. While each of these inventions has been disclosed in a preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Accordingly, it is appropriate that the appended claims be construed broadly and in a manner consistent with the scope of the disclosure as set forth in the following claims.

It is also to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention. Additionally, it is also to be understood that the components of the apparatuses described herein, the consumable assemblies described herein, or portions thereof may be fabricated from any suitable material or combination of materials, such as plastic or metals (e.g., copper, bronze, hafnium, etc.), as well as derivatives thereof, and combinations thereof. In addition, it is further to be understood that the steps of the methods described herein may be performed in any order or in any suitable manner.

Finally, when used herein, the term "comprises" and its derivations (such as "comprising", etc.) should not be understood in an excluding sense, that is, these terms should not be interpreted as excluding the possibility that what is described and defined may include further elements, steps, etc. Similarly, where any description recites "a" or "a first" element or the equivalent thereof, such disclosure should be understood to include incorporation of one or more such elements, neither requiring nor excluding two or more such elements. Meanwhile, when used herein, the term "approximately" and terms of its family (such as "approximate", etc.)

should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about", "around", "generally", and "substantially."

What is claimed is:

1. A system comprising:
an acoustical capturing device; and
an acoustic analysis processor configured to:
    compare a resonance frequency of acoustic signals captured by the acoustical capturing device to a baseline resonance frequency, wherein the acoustic signals are generated by a plasma torch consumable; and
    determine an amount of wear and/or a defect of the plasma torch consumable based on a change in the resonance frequency of acoustic signals captured by the acoustical capturing device from the baseline resonance frequency.

2. The system of claim 1, wherein the baseline resonance frequency is based on a plurality of iterations of acoustic signals captured by the acoustical capturing device.

3. The system of claim 1, wherein the acoustic signals are iteratively captured after successive uses of the plasma torch consumable; and
    wherein the acoustic analysis processor is further configured to compile the acoustic signals into a spectrogram representative of wear levels of the plasma torch consumable over a life of the plasma torch consumable.

4. The system of claim 3, wherein the acoustic analysis processor is configured to determine the amount of wear of the plasma torch consumable by comparing an additional acoustic signal captured by the acoustical capturing device to the spectrogram of the plasma torch consumable.

5. The system of claim 1, further comprising an enclosure for receiving the acoustical capturing device and the plasma torch consumable.

6. The system of claim 1, wherein the acoustic signals are generated via a gas flowing between a nozzle and an electrode of the plasma torch consumable for discharge via an orifice of the nozzle, wherein the electrode is configured to initiate and stabilize an arc for plasma cutting.

7. A method comprising:
directing, via an acoustical output generating device, an acoustic signal to interact with a plasma torch consumable,
detecting, via an acoustical capturing device, the acoustic signal after the acoustic signal interacts with the plasma torch consumable; and
determining, via an acoustic analysis processor, an amount of wear and/or a defect of the plasma torch consumable based on the acoustic signal detected by the acoustical capturing device after the acoustic signal interacts with the plasma torch consumable.

8. The method of claim 7, wherein the acoustic signal is indicative of a size and/or a shape of a nozzle and/or of an electrode of the plasma torch consumable.

9. The method of claim 7, further comprising directing the acoustic signal as part of a sweep through a range of frequencies and/or waveforms.

10. The method of claim 7, wherein detecting the acoustic signal comprises capturing amplitudes of the acoustic signal over a range of resonance frequencies and/or waveforms.

11. The method of claim 7, further comprising performing analysis iterations of the plasma torch consumable to determine a spectral analysis of the plasma torch consumable over a life of the plasma torch consumable.

12. The method of claim 11, wherein each analysis iteration comprises:
performing a cutting operation with the plasma torch consumable;
detecting an iterative acoustic signal via the acoustical capturing device, the iterative acoustic signal being generated by flowing a gas between a nozzle and an electrode of the plasma torch consumable after completion of the cutting operation; and
determining whether the amount of wear of the plasma torch consumable has reached a predetermined amount of wear.

13. The method of claim 12, wherein, upon determining that the plasma torch consumable has reached the predetermined amount of wear, the method further comprises:
compiling the iterative acoustic signals from the analysis iterations into a spectrogram via the acoustic analysis processor.

14. The method of claim 13, wherein the acoustic signal is a first detected acoustic signal and the plasma torch consumable is a first plasma torch consumable, the method further comprising:
comparing, via the acoustic analysis processor, a second detected acoustic signal of a second plasma torch consumable to the spectrogram to determine an amount of wear of the second plasma torch consumable.

15. The method of claim 7, comprising replacing the plasma torch consumable with a new plasma torch consumable in response to determining that the plasma torch consumable has reached a predetermined amount of wear.

16. An apparatus comprising:
an acoustical output generating device configured to generate an acoustic signal and output the acoustic signal to a plasma torch consumable to cause the acoustic signal to interact with the plasma torch consumable;
an acoustical capturing device configured to receive the acoustic signal after the acoustic signal interacts with the plasma torch consumable; and
a processor configured to:
    determine an amount of wear and/or a defect of the plasma torch consumable based on the acoustic signal received by the acoustical capturing device after the acoustic signal interacts with the plasma torch consumable.

17. The apparatus of claim 16, wherein the processor is configured to determine the amount of wear and/or the defect of the plasma torch consumable by analyzing a resonance frequency of the acoustic signal.

18. The apparatus of claim 16, wherein the acoustical output generating device comprises a speaker.

19. The apparatus of claim 16, wherein:
the acoustical output generating device is configured to generate and output a plurality of generated acoustic signals at a first period of time and a second period of time;
the acoustical capturing device is configured to:
    receive a first plurality of resulting acoustic signals resulting from an interaction between the plurality of generated acoustic signals and the plasma torch consumable during the first period of time; and
    receive a second plurality of resulting acoustic signals resulting from an interaction between the plurality of generated acoustic signals and the plasma torch consumable during the second period of time; and the processor is configured to:
  generate a first signature based on the first plurality of resulting acoustic signals;
  generate a second signature based on the second plurality of resulting acoustic signals; and
  determine the amount of wear and/or the defect of the plasma torch consumable based on a difference between the first signature and the second signature.

20. The apparatus of claim 19, wherein the plurality of generated acoustic signals comprises a sweep through sinusoidal frequencies.

\* \* \* \* \*